(12) United States Patent
Ichieda

(10) Patent No.: US 9,041,695 B2
(45) Date of Patent: May 26, 2015

(54) PROJECTOR AND METHOD OF CONTROLLING PROJECTOR

(71) Applicant: Seiko Epson Corporation, Tokyo (JP)

(72) Inventor: Hiroyuki Ichieda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 124 days.

(21) Appl. No.: 13/708,022

(22) Filed: Dec. 7, 2012

(65) Prior Publication Data

US 2013/0162607 A1  Jun. 27, 2013

(30) Foreign Application Priority Data

Dec. 27, 2011  (JP) .................................. 2011-285317

(51) Int. Cl.
*G06F 3/038*   (2013.01)
*G09G 5/00*    (2006.01)
*G03B 21/14*   (2006.01)
*G06F 3/042*   (2006.01)

(52) U.S. Cl.
CPC .............. *G03B 21/14* (2013.01); *G06F 3/0425* (2013.01)

(58) Field of Classification Search
CPC .............................. G06F 3/0425; G03B 21/14
USPC ......................................................... 345/204
See application file for complete search history.

(56) References Cited

U.S. PATENT DOCUMENTS

| 2002/0015137 | A1* | 2/2002 | Hasegawa ........................ 353/42 |
| 2006/0238517 | A1* | 10/2006 | King et al. .................... 345/173 |
| 2011/0261030 | A1* | 10/2011 | Bullock ........................ 345/204 |
| 2012/0044140 | A1  | 2/2012 | Koyama et al. |
| 2012/0194545 | A1* | 8/2012 | Shibata et al. ................ 345/629 |
| 2013/0222892 | A1* | 8/2013 | Jesme .......................... 359/352 |

FOREIGN PATENT DOCUMENTS

| JP | 6-242884 A    | 9/1994 |
| JP | 4272904 B     | 6/2009 |
| JP | 2010-146328 A | 7/2010 |
| JP | 2012-53584 A  | 3/2012 |

* cited by examiner

*Primary Examiner* — Charles V Hicks

(74) *Attorney, Agent, or Firm* — ALG Intellectual Property, LLC

(57) ABSTRACT

A projector can control a function in accordance with an operation of indicating a position if the operation is performed in a state in which an image is displayed. The projector projects an image on a screen based on a supply image supplied by an image source. The projector detects a position indicated on the screen using a position detection unit, and if the indication position detected is located within the operation area set previously, the projector controls the projection configuration of the image using a control section.

7 Claims, 12 Drawing Sheets

PROJECTOR AND METHOD OF CONTROLLING PROJECTOR

BACKGROUND

1. Technical Field

The present invention relates to a projector, and a method of controlling a projector.

2. Related Art

In the past, there has been known a device, which, when a specific position of an image displayed by a display device such as a projector is indicated, detects the indication position, and then displays a pointer or the like so as to correspond to the position thus detected (see, e.g., Japanese Patent No. 4272904). According to this type of device, it is possible to display the pointer or the like at an arbitrary position by the operation of indicating the position.

Incidentally, since the operation of indicating the position in the state in which the image is displayed can be performed with intuition and ease, there have been the needs for making it possible to perform much more functions by the operation of indicating the position besides the function of displaying the pointer or the like at an arbitrary position as is performed in the related art device.

SUMMARY

An advantage of some aspects of the invention is to provide a projector, which, when an operation of indicating a position is performed in the state in which an image is displayed, can control a function by the operation, and a method of controlling the projector.

An aspect of the invention is directed to a projector adapted to project an image on a projection surface based on a supply image supplied by an image source. The projector includes a position detector adapted to detect a position indicated on the projection surface, and a projection controller adapted to control a projection configuration of the image in the case an indication position detected by the position detector is located within a predetermined operation area.

According to this aspect of the invention, since the projection configuration of the image presently projected is controlled in accordance with the operation to the projection surface, for example, expansion, contraction, translation and so on of the image presently projected can be performed. Thus, it is possible to make the operation related to the projection configuration of the image intuitive and easy to thereby achieve the improvement of the operability.

The projector according to the above aspect of the invention may be configured such that the projector further includes a processing section adapted to perform a process based on the indication position detected by the position detector, and either of the process by the processing section and the control by the projection controller is performed in case that the indication position detected by the position detector is located within the predetermined operation area.

According to this configuration, it is possible to selectively use the function of performing the process such as drawing based on the indication position and the function of controlling the projection configuration of the image based on the indication position according to the circumstances, and further improvement of the operability can be achieved.

The projector according to the above aspect of the invention may be configured such that the processing section performs at least one of a process of generating an additional image to be projected on the projection surface together with the image, and a process of outputting information including the indication position detected by the position detector to an external device based on the indication position detected by the position detector.

According to this configuration, it is possible to selectively use the function of generating the additional image based on the indication position or the function of outputting the information including the indication position to the external device, and the function of controlling the projection configuration of the image based on the indication position according to the circumstances, and further improvement of the operability can be achieved.

The projector according to the above aspect of the invention may be configured such that the position detector detects the indication position indicated on the projection surface by the indication body, the position detector includes an operation detector adapted to detect an operation of an indication body, and in the case the operation of the indication body is detected by the operation detector when the indication position detected by the position detector is located within the operation area, the control by the projection controller is performed.

According to this configuration, it is possible to selectively use the function of the processing section and the function of controlling the projection configuration of the image according to the circumstances with ease, and it is possible to achieve further improvement of the operability.

The projector according to the above aspect of the invention may be configured such that the position detector detects the indication position indicated on the projection surface by an indication body, and an operation of the indication body, and in the case the operation of the indication body is detected by the position detector when the indication position detected by the position detector is located within the operation area, the control by the projection controller is performed.

According to this configuration, since the indication position and the operation of the indication body are detected, and then the control is performed in the case the indication position is located within the operation area, it is possible to selectively use the function of the processing section and the function of controlling the projection configuration of the image according to the circumstances with ease in accordance with the operation of the indication body, and it is possible to achieve further improvement of the operability.

The projector according to the above aspect of the invention may be configured such that the projector further includes an operating image display section adapted to project an operating image adapted to perform an instruction related to a projection configuration of the image so as to overlap the image, and a display area of the operating image is set in the operation area.

According to this configuration, since the projection configuration of the image presently projected is controlled using the operation based on the operating image projected on the projection surface, it is possible to make the operation related to the projection configuration of the image more intuitive and easy to thereby achieve the improvement of the operability.

The projector according to the above aspect of the invention may be configured such that the operating image display section projects the operating image, which is adapted to instruct at least one of processes of expansion, contraction, translation, and rotation of the image projected on the projection surface, on the projection surface, and the projection controller performs a process corresponding to the operating image overlapping the indication position detected by the position detector to change the projection configuration of the image.

According to this configuration, since either of the processes of expansion, contraction, and translation of the image presently projected is performed using the operation to the operating image projected on the projection surface, it is possible to make the operation related to the projection configuration of the image more intuitive and easy to thereby achieve the improvement of the operability.

The projector according to the above aspect of the invention may be configured such that the operation area is set to an area outside a range in which the image is projected on the projection surface, and within a range in which the indication position can be detected by the position detector.

According to this configuration, since the projection configuration of the image presently projected is controlled using the operation of indicating outside the image thus projected, it is possible to make the operation related to the projection configuration more intuitive and easy to thereby achieve the improvement of the operability.

Another aspect of the invention is directed to a method of controlling a projector adapted to project an image on a projection surface based on a supply image supplied by an image source. The method includes detecting a position indicated on the projection surface, and controlling, in the case the indication position detected is located within a predetermined operation area, a projection configuration of the image.

According to this aspect of the invention, the projection configuration of the image can be controlled in accordance with the operation to the projection surface. For example, expansion, contraction, translation, and soon of the input image can be performed in accordance with the operation to the projection surface. Thus, it is possible to make the operation related to the projection configuration of the input image intuitive and easy to thereby achieve the improvement of the operability.

Still another aspect of the invention is directed to a computer executable program adapted to control a projector adapted to project an image on a projection surface based on a supply image supplied by an image source. The program makes the projector function as a position detector adapted to detect a position indicated on the projection surface, and a projection controller adapted to control a projection configuration of the image in the case an indication position detected by the position detector is located within a predetermined operation area. Further, it is also possible to realize the program described above as a recording medium storing the program described above in a computer readable manner.

According to this aspect of the invention, it is possible to make the operation related to the projection configuration of the input image intuitive and easy to thereby achieve the improvement of the operability.

BRIEF DESCRIPTION OF THE DRAWINGS

The invention will be described with reference to the accompanying drawings, wherein like numbers reference like elements.

FIGS. 4A and 4B are diagrams showing an example of projecting an image on a screen, wherein FIG. 4A shows a state of projecting a pointer in accordance with an indication position, and FIG. 4B shows an example of performing drawing in accordance with the indication position.

FIGS. 7A and 7B are diagrams showing a configuration example of a menu bar and a tool bar to be projected on the screen, wherein FIG. 7A shows a configuration example of the menu bar, and FIG. 7B shows a configuration example of a zoom tool bar to be projected by the operation of the menu bar.

DESCRIPTION OF EXEMPLARY EMBODIMENTS

First Embodiment

An embodiment to which the invention is applied will hereinafter be explained with reference to the accompanying drawings.

Figure 1:
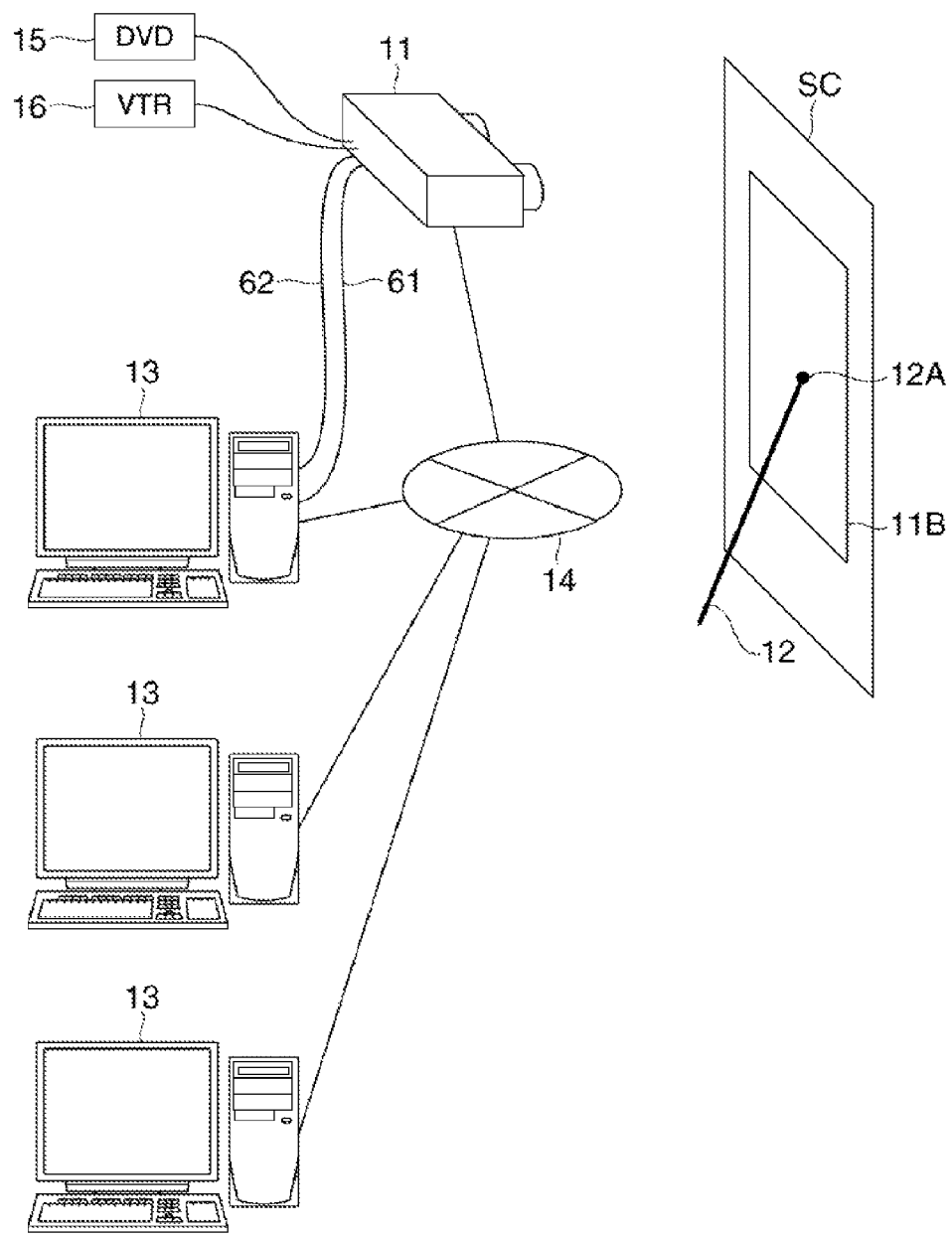
FIG. 1 is a diagram showing a configuration of a display system according to a first embodiment of the invention.

FIG. 1 is a diagram showing a configuration of a display system 10 using a projector 11 according to the embodiment.

To the projector 11 as the display device, there are connected in a wired manner a personal computer (PC) 13, a DVD player 15, and a video recorder 16 as image supply devices. To the projector 11, there are connected via a network 14 a plurality of PCs 13, and it is possible to supply the projector 11 with image information (image data) from either of the PCs 13. It should be noted that in the present embodiment the image information includes either of the data representing a still image and the data representing a moving image. Further, the image information includes either of analog image data and digital image data. The network 14 is constituted by a wired communication line such as a LAN cable or a wireless communication line, and the network 14 and the projector 11 are connected to each other in a wired or wireless manner. Various types of data can be transmitted and received between the projector 11 and each of the PCs 13 via the network 14.

In the configuration shown in FIG. 1 as an example, the projector 11 is connected to one of the PCs 13 via an RGB cable 61 for transmitting analog image data, and a USB cable 62 for transmitting digital data. The PC 13 can output analog image data to the projector 11 via the RGB cable 61. Further, the projector 11 transmits and receives a variety of types of control information (control data) and so on including coordinate information (coordinate data) described later with the PC 13 via the USB cable 62. It should be noted that it is obviously possible to connect the PC 13 and the projector 11 to each other with a DVI cable or the like to thereby transmit digital image data.

The projector 11 projects an image on the screen SC as a projection surface based on the image data input from the PC 13, the DVD player 15, and the video recorder 16. The projector 11 is capable of projecting the image regardless of whether the image information input from the PC 13, the DVD player 15, or the video recorder 16 is still image data or moving image data. The screen SC is not limited to a flat plate fixed to the wall surface, but it is also possible to use the wall surface itself as the screen SC. Here, the range in which the image is projected on the screen SC is defined as an actual projection area 11B (a displayable area). Further, the projector 11 is connected to the PC 13 with a communication cable or the like (e.g., the USB cable 62), and transmits/receives the control data and so on to/from the PC 13. The projector 11 can also transmit/receive control data and so on to/from the PC 13 with wireless communication such as Bluetooth (registered trademark).

In the display system 10, the user can perform the operation (position indication operation) of indicating an arbitrary position in the actual projection area 11B of the screen SC with an indication body 12 in the hand during the projection of the image by the projector 11. The indication body 12 is an operation device having a pen-like shape or a rod shape, and is used for indicating an arbitrary position on the screen SC. The projector 11 has a function of detecting the tip position of the indication body 12 as described later, and outputs the control data representing the coordinate of the indication position thus detected to the PC 13. Further, the projector 11 performs a process of, for example, drawing an image along the indication position based on the coordinate of the indication position thus detected.

Figure 2:
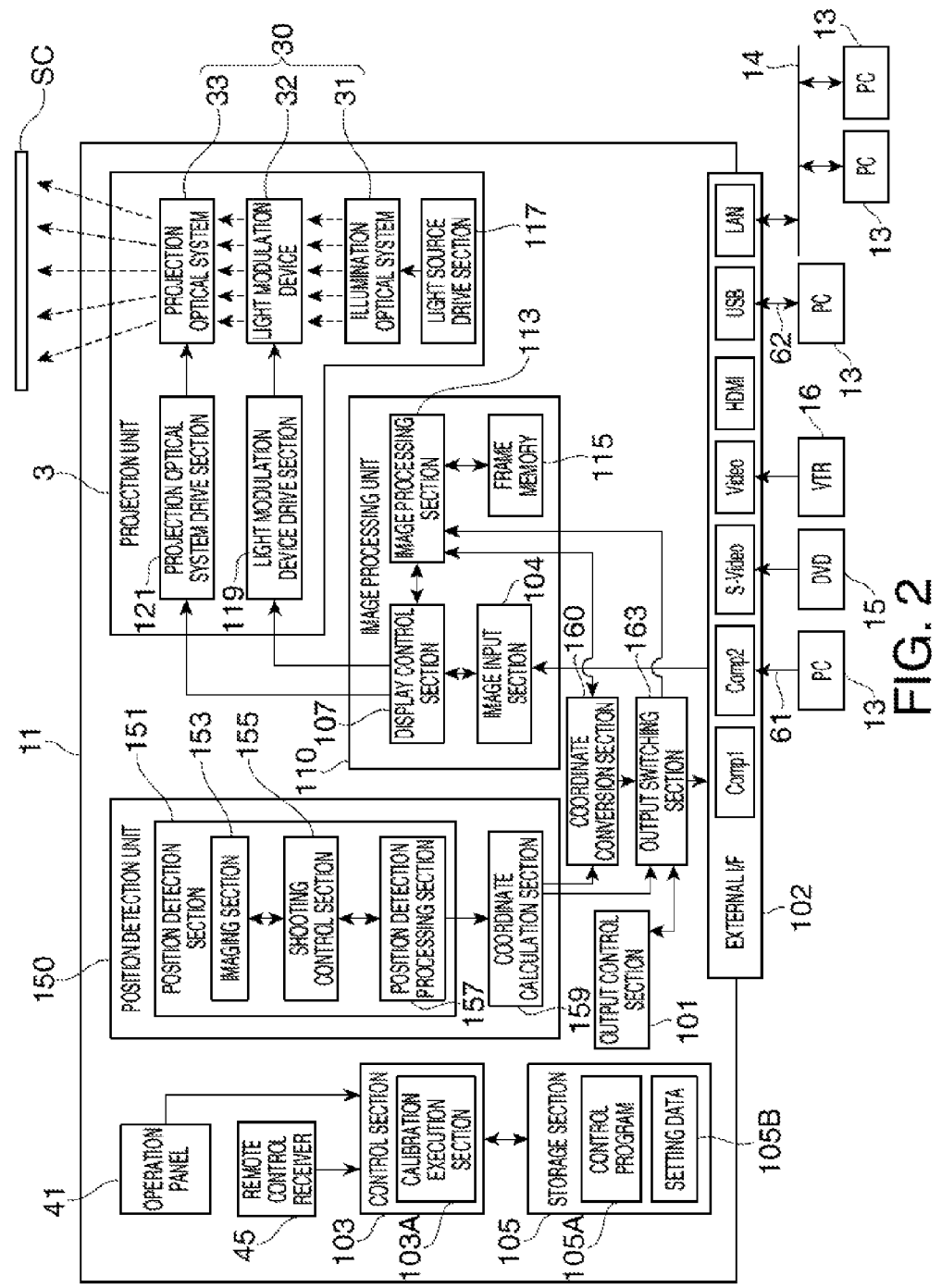
FIG. 2 is a block diagram showing a functional configuration of a projector.

FIG. 2 is a block diagram showing a functional configuration of the projector 11.

Broadly speaking, the projector 11 is provided with an image processing unit 110 for performing image processing for display based on an input image input from the PC 13 via the RGB cable 61 or the network 14 and an input image input from the DVD player 15, the video recorder 16, and so on, a projection unit 3 (a display) for projecting the image on the screen SC following the control by the image processing unit 110, a position detection unit 150 for detecting the indication position of the indication body 12 on the screen SC, a coordinate conversion section 160 for converting the coordinate of the indication position detected by the position detection unit 150 into the coordinate in the image data, an output switching section 163 for outputting the coordinate after the conversion converted by the coordinate conversion section 160 to the PC 13 or the image processing unit 110, an output control section 101 for making the output switching section 163 switch the output destination to which the coordinate is output, and a control section 103 for controlling each of the sections described above.

The control section 103 is composed of a CPU, a nonvolatile memory, a RAM, and so on not shown, and reads out and then executes a control program 105A stored in a storage section 105 connected to the control section 103 to thereby control each section of the projector 11. Further, by executing the control program 105A stored in the storage section 105, the control section 103 functions as a calibration execution section 103A.

The calibration execution section 103A executes a calibration described later to thereby obtain parameters (coordinate conversion parameters) representing the correspondence relationship between the coordinate in the shot image data and the coordinate in the area (e.g., actual projection area 11B) on the screen SC to be the object of the calibration. The storage section 105 is formed of a magnetic or optical recording device, or a semiconductor storage element, and stores a variety of types of programs including the control program 105A, and data such as various setting values.

To the control section 103, there are connected an operation panel 41 and a remote control receiver 45.

The operation panel 41 is provided with a variety of types of switches and indicator lamps, and is disposed to an exterior housing (not shown) of the projector 11. The control section 103 appropriately lights or blinks the indicator lamps of the operation panel 41 in accordance with the operation state and the setting state of the projector 11. Further, if the switch of the operation panel 41 is operated, the operation signal corresponding to the switch thus operated is output to the control section 103. The operation panel 41, the remote controller, and so on correspond to the operation section for the user to input the operation with respect to the projector 11. It should be noted that it is also possible to transmit an operation signal representing the operation with respect to the projector 11 from the PC 13 to the projector 11 to thereby control the projector 11 based on the operation signal. In the case of transmitting the operation signal from the PC 13, it is possible to transmit the operation signal to the projector 11 via, for example, a USB interface. In this case, the PC 13 also functions as the operation section for the user to input the operation with respect to the projector 11.

Further, the projector 11 receives the infrared signal, which the remote controller (not shown) used by the user as the operator of the projector 11 transmits in accordance with the button operation, with the remote control receiver 45. The remote control receiver 45 receives the infrared signal received from the remote controller with a light receiving element, and then outputs an operation signal corresponding to this signal to the control section 103.

The control section 103 detects the operation of the user based on the operation signal input from the operation panel 41 or the remote control receiver 45, and then controls the projector 11 in accordance with this operation.

The projector 11 is provided with an external I/F 102 to be connected to the PC 13, the network 14, the DVD player 15, the video recorder 16, and so on. The external I/F 102 is an interface for transmitting/receiving a variety of types of information such as control information or image information (analog image data and digital image data), and is provided with a plurality of types of connectors and the interface circuits corresponding to these connectors. In the present embodiment, the external I/F 102 has Comp interfaces to be connected to a video output terminal of a computer, S-Video interface and Video interface to be connected to a video playback device or a DVD playback device, HDMI (registered trademark) interface compliant with the HDMI standard to which a digital home electrical appliance and so on are connected, USB interface to be connected to the USB terminal of the computer and LAN interface to be connected to a LAN configured including a computer.

The Comp interfaces correspond to VGA terminals to which analog image data is input from a computer, a digital visual interface (DVI) to which digital image data is input, and so on. In the present embodiment, the RGB cable 61 (FIG. 1) is connected to the Comp interface, and the USB cable 62 (FIG. 1) is connected to the USB interface.

The S-Video interface is provided with an S-video terminal to which a composite video signal such as NTSC, PAL, or SECAM is input from an image supply device such as a video playback device, a DVD playback device, a television tuner, a set-top box of a CATV, or a video game machine. In the present embodiment, the DVD player 15 is connected to the S-Video interface.

The Video interface is provided with an RCA terminal to which a composite video signal is input from the image supply device described above or a D-terminal to which a component video signal is input therefrom, and analog image data is input thereto. In the present embodiment, the video recorder 16 is connected to the Video interface.

The USB interface is provided with a USB terminal not shown, and a USB controller (not shown) for transmitting/receiving control data and digital image data to/from the computer via the USB terminal. Here, the external I/F 102 can also be provided with a USB-B interface for connecting a device to be a USB host device such as the PC 13, or can also be provided with a USB-A interface for connecting a device such as a USB memory or a video camera functioning as a USB slave device with respect to the projector 11. Further, it is also possible to provide both of the USB-A and USB-B interfaces.

Further, the LAN interface is provided with a terminal such as an RJ-45 terminal to which a LAN cable can be connected, and is connected to a LAN including one or a plurality of computers via this terminal. The LAN interface is provided with a network interface circuit (not shown) compliant with, for example, the Ethernet (registered trademark) standard, and transmits/receives control data and image data to/from the computer constituting the LAN.

Further, there can also be adopted a configuration in which the external I/F 102 is provided with a DisplayPort developed by the Video Electronics Standard Association (VESA), and specifically, there can also be adopted a configuration in which the external I/F 102 is provided with the DisplayPort connector or the Mini-DisplayPort connector and an interface circuit compliant with the DisplayPort standard. In this case, the projector 11 is connected to the DisplayPort provided to the PC 13 or a portable device having an equivalent function to the PC 13, and becomes capable of inputting the digital image data.

Further, it is also possible for the external I/F 102 to perform transmission/reception of the image information with wired communication, or to perform transmission/reception of the image information with wireless communication. For example, it is also possible to provide a wireless communication interface such as a wireless LAN to the external interface 102, and to connect the projector 11 to a variety of types of devices such as the PC 13 via the wireless communication line.

The devices (the image supply devices) connected to the respective interface provided to the external I/F 102 are each referred to as an image source, and the image information input from the image sources is collectively referred to as an input image. Therefore, the input image includes both of the analog image data and the digital image data.

The projector 11 is composed of an optical system for performing optical image formation and an image processing system for electrically processing the image data in view of the general classification. The optical system is provided with a projection section 30 (a projector) composed of an illumination optical system 31, a light modulation device 32, and a projection optical system 33. The illumination optical system 31 is provided with a light source formed of a xenon lamp, a super-high pressure mercury lamp, a light emitting diode (LED), a laser, or the like. Further, the illumination optical system 31 can also be provided with a reflector and an auxiliary reflector for guiding the light emitted by the light source to the light modulation device 32, and can be a system provided with, for example, a lens group (not shown) for improving the optical characteristics of the projection light, a polarization plate, or a photochromic element for reducing the light intensity of the light emitted by the light source on the path leading to the light modulation device 32.

The light modulation device 32 is provided with a modulation area for modulating the incident light, and modulates the light from the illumination optical system 31 while receiving the signal from the image processing system described later. In the present embodiment, the explanation will be presented citing the case of configuring the light modulation device 32 using a transmissive liquid crystal panel as an example. In this configuration, the light modulation device 32 is composed of three liquid crystal panels corresponding respectively to the three primary colors of RGB in order to perform color projection. The light from the illumination optical system 31 is separated into colored lights of three colors of RGB, and the colored lights enter the corresponding liquid crystal panels, respectively. The colored lights modulated while passing through the respective liquid crystal panels are combined by a combining optical system such as a cross dichroic prism, and are then output to the projection optical system 33.

The projection optical system 33 is provided with, for example, a zoom lens for performing expansion and contraction of the image to be projected and adjustment of the focus, a zoom controlling motor for controlling the level of the zoom, and a focus adjusting motor for performing the focus adjustment.

The projection unit 3 is provided with a projection optical system drive section 121 for driving the motors provided to the projection optical system 33 in accordance with the control by the display control section 107, a light modulation device drive section 119 for driving the light modulation device 32 so as to modulate the incident light based on the image data output from the display control section 107, and a light source drive section 117 for driving the light source provided to the illumination optical system 31 in accordance with the control by the control section 103 in addition to the projection section 30.

On the other hand, the image processing system is formed of the image processing unit 110 for processing the image data in accordance with the control by the control section 103 for integrally controlling the whole of the projector 11. The image processing unit 110 is provided with an image input section 104 for processing the input image input from the external I/F 102. The image input section 104 has, for example, an A/D conversion circuit for converting analog image data to digital image data, and converts the analog image data input via the analog video terminal provided to the external I/F 102 into the digital image data, and then outputs the digital image data to an image processing section 113. Further, the image input section 104 has a function of determining the port to which the input picture is input in the external I/F 102.

Further, the image processing unit 110 is provided with a display control section 107 for selecting at least one or more input images out of the input images input from the external I/F 102 via the image input section 104 in accordance with the control of the control section 103, and then making the image processing section 113 perform a process for displaying the image based on the image data as the input image thus selected, and the image processing section 113 for processing the input image in accordance with the control by the display control section 107 to thereby develop the image to be projected by the projection section 30 on a frame memory 115. The image processing unit 110 functions as a processing section and a display controller.

The control section 103 reads out and executes the control program 105A stored in the storage section 105 to thereby control each section of the projector 11.

The display control section 107 performs determination of the format (the frame rate, the resolution, and the compression state) of the image data input via the image input section 104, and so on to thereby determine the necessary process for displaying the display image on the light modulation device 32, and then controls the image processing section 113 to perform the process. The image processing section 113 develops the image data, which is input via the image input section 104, on the frame memory 115 in accordance with the control of the display control section 107, then performs various conversion processes such as interlace/progressive conversion, or resolution conversion if necessary to thereby generate the image signal with a predetermined format for displaying the display image drawn on the frame memory 115, and then outputs it to the display control section 107. It should be noted that the projector 11 can also perform the display after changing the resolution and the aspect ratio of the image data thus input, or perform the display while keeping the resolution and the aspect ratio of the image data thus input in a dot-by-dot manner. Further, the image processing section 113 can perform various types of image processing such as a keystone correction, a color compensation corresponding to a color mode, and image expansion/contraction process in accordance with the control of the display control section 107. The display control section 107 outputs the image data processed by the image processing section 113 to the light modulation device drive section 119 to display it on the light modulation device 32. Further, the image processing section 113 obtains the image position information (the image position data) based on the information such as the resolution and the aspect ratio of the image data presently displayed, and the display size in the liquid crystal panel of the light modulation device 32, and then outputs the image position information thus obtained to the coordinate conversion section 160. The image position information is the information representing what position in the actual projection area 11B the display image is projected (displayed) at. In other words, the image position information is the information related to the location of the display image in the actual projection area 11B, and represents the position (location) of the display image in the actual projection area 11B. The image position information varies in the case (e.g., the case in which the setting with respect to the resolution is changed in the PC 13) in which, for example, the resolution of the image data output by the PC 13 to the projector 11 is varied due to the variation in the display resolution of the PC 13. It should be noted that since the image having been modulated in the modulation area of the light modulation device 32 is displayed in the actual projection area 11B, it is also possible to regard the image position information as the information related to the location of the image in the modulation area of the light modulation device 32.

The control section 103 performs the control program 105A to thereby control the display control section 107 to execute the keystone correction of the display image imaged on the screen SC. Further, the control section 103 controls the display control section 107 to execute the expansion/contraction processes of the display image based on the operation signal input from the operation panel 41 or the remote control receiver 45.

In the case in which the analog image data is input to the image input section 104 from a device connected to the external I/F 102, the analog image data is converted into the digital image data by the image input section 104, and is thereafter processed as the digital image data. Further, in the case in which the digital image data is input to the image input section 104 from a device connected to the external I/F 102, the image input section 104 outputs it directly as the digital image data to the image processing section 113. As described above, since the image processing unit 110 performs the process as the digital image data regardless of whether the input image is the analog data or the digital data, the process of A/D-converting the analog image data will be omitted in the explanation below, and the explanation will be presented assuming that the image processing unit 110 processes the image data.

The control section 103 selects any one or more image sources out of the image sources connected to the external I/F 102, and then inputs the input image of the image sources thus selected to the image input section 104. Further, the control section 103 has a function of determining the image source input from the external I/F 102 to the image input section 104.

Here, the control section 103 can also perform the selection and the determination for each of the types of the interfaces to which the respective image sources are connected in the external I/F 102, or perform the selection and the determination for each of the types of the input images input from the respective image sources, or perform the selection and the determination connector by connector. Further, it is also possible to select and determine the image source by identifying the types themselves of the respective devices connected to the external I/F 102. For example, since the device connected to the HDMI interface or the LAN interface transmits/receives the control data to/from the projector 11, the types of the respective devices can be determined based on the control data. Specifically, it is also possible to specifically specify the device as the image source such as the PC 13, the DVD recorder, the USB memory, a personal digital assistant (PDA), a cellular phone, and a medium player provided with a semiconductor memory, and then classify them, and then determine the type of the image source based on the classification.

Further, in the case in which the image data is stored in the storage section 105, when the playback display of the image data stored in the storage section 105 is instructed due to the operation detected by the operation panel 41 or the remote control receiver 45, the control section 103 can also select the projector 11 itself as the image source. Further, it is also possible for the projector 11 to take an external storage device such as a USB flash memory connected to the USB interface of the external I/F 102 as the image source, and to perform slide-show display for sequentially displaying a plurality of images which can be supplied from the external storage device.

Further, the projector 11 is provided with a so-called multi-screen display function of displaying a plurality of input images on the screen SC side by side at the same time as described later. Due to the operation detected by the operation panel 41 or the remote control receiver 45, or the previous setting, the control section 103 performs the multi-screen display of dividing the area (a projection-allowable area 11A or the actual projection area 11B) on which the image can be displayed into a plurality of areas, and then displaying the plurality of input images input from the respective image sources (the image supply devices) side by side. In the case of performing the multi-screen display, the control section 103 selects the image sources out of the plurality of image sources connected to the external I/F 102 within the upper limit number of images, which can simultaneously be displayed in the multi-screen display.

The projector 11 has the position detection unit 150 (a position detector) for detecting the coordinate of the indication position indicated by the indication body 12 on the screen SC. The position detection unit 150 obtains the coordinate of the indication position thus detected in the area on the screen SC to be the object of the calibration. The position detection unit 150 is provided with position detection section 151 having an imaging section 153 for shooting the screen SC, a shooting control section 155 for controlling the imaging section 153, and a position detection processing section 157 for detecting the indication position of the indication body 12 based on the shot image of the imaging section 153, and a coordinate calculation section 159 for calculating the coordinate of the indication position detected by the position detection section 151.

The imaging section 153 is a digital camera for shooting a field angle including maximum range (corresponding to the projection-allowable area 11A) in which the projection section 30 can project an image on the screen SC, and performs the shooting in accordance with the control of the shooting control section 155, and then outputs the shot image data. In other words, the imaging section 153 is set to be able to shoot the range including the entire projection-allowable area 11A. The shooting control section 155 controls the imaging section 153 to perform the shooting in accordance with the control of the control section 103. In the case in which the imaging section 153 has a mechanism for adjusting the zoom magnification, the focus, and the aperture in the shooting operation, the shooting control section 155 controls the mechanism to perform the shooting on the conditions set previously. After the shooting operation, the shooting control section 155 obtains the shot image data output by the imaging section 153, and then outputs it to the position detection processing section 157. The shot image data output from the imaging section 153 can also be the data expressed in the form of RGB or YUV, or can also be the data representing only the luminance component. Further, the shooting control section 155 can also output the shot image data, which is output from the imaging section 153, to the position detection processing section 157 without conversion, or can also output it to the position detection processing section 157 after performing the adjustment of the resolution or the conversion into a predetermined file format (e.g., JPEG and BMP).

It should be noted that the imaging section 153 can also has a configuration capable of imaging the visible light, or a configuration capable of imaging the non-visible light (e.g., infrared light). In the case in which the imaging section 153 can image the non-visible light, it is possible to adopt, for example, the configuration in which the indication body 12 emits the non-visible light, and the imaging section 153 images the invisible light emitted from the indication body 12, and the configuration in which the indication body 12 has the reflecting section capable of reflecting the invisible light, due to the control of the control section 103, the invisible light is projected from the projector 11 toward the screen SC, and then the non-visible light reflected by a reflecting section of the indication body 12 is imaged by the imaging section 153.

The position detection processing section 157 analyzes the shot image data input from the shooting control section 155 to thereby extract the boundary between the outside of the actual projection area 11B and the actual projection area 11B and the image of the indication body 12 from the shot image data, and then identifies the indication position of the indication body 12. The indication position of the indication body 12 corresponds to, for example, a position of the tip of the indication body 12 having a rod shape or a pen shape.

The coordinate calculation section 159 performs the calculation of the coordinate based on the indication position of the indication body 12 detected by the position detection processing section 157 and the coordinate conversion parameters obtained by the calibration execution section 103A. Specifically, the coordinate calculation section 159 obtains the coordinate of the indication position in the actual projection area 11B, detected by the position detection processing section 157, and then outputs the coordinate data (the coordinate information) representing the coordinate thus calculated to the coordinate conversion section 160. In the following explanation, the coordinate data calculated by the coordinate calculation section 159, and then output from the position detection unit 150 is also referred to as "first coordinate data." In the present embodiment, the first coordinate data represents the coordinate normalized in the area, which has been a object of the calibration, on the screen SC. For example, if the entire actual projection area 11B is the object of the calibration, taking the upper left vertex of the actual projection area 11B as the origin (0, 0), the coordinates of the upper right vertex, the lower left vertex, and the lower right vertex of the actual projection area 11B can be expressed as (1, 0), (0, 1), and (1, 1), respectively. In this case, the coordinate of the center of the actual projection area 11B is expressed as (0.5, 0.5). It should be noted that although the normalization of the coordinate is performed here in the range equal to or higher than 0 and equal to or lower than 1, the method of normalization is not limited thereto. For the normalization of the coordinate, there can be used an arbitrary value (e.g., the range equal to or higher than 0 and equal to or lower than 32767) defined logically.

The coordinate conversion section 160 converts the first coordinate data (the first coordinate information) output by the position detection unit 150 into a second coordinate data (second coordinate information) representing the coordinate in the image data input by the PC 13 to the projector 11. Specifically, the coordinate conversion section 160 converts the first coordinate data representing the coordinate on the screen SC into the second coordinate data representing the coordinate in the input image data based on the image position information output by the image processing section 113. The second coordinate data represents the coordinate normalized in the image data. For example, taking the upper left vertex of the image data as the origin (0, 0), the coordinates of the upper right vertex, the lower left vertex, and the lower right vertex of the image data can be expressed as (1, 0), (0, 1), and (1, 1), respectively. In this case, the coordinate of the center of the image data is expressed as (0.5, 0.5).

The first coordinate data output by the position detection unit 150 represents the coordinate detected based on the shot image data of the imaging section 153, and the coordinate can be represented by the coordinate in the coordinate axes virtually provided on the screen SC. However, the correspondence relationship between the coordinate on the screen SC and the coordinate on the shot image data is affected by a variety of factors such as the distance between the imaging device 5 and the screen SC. Therefore, the coordinate on the shot image data corresponding to a certain position on the screen SC varies in accordance with these factors. Therefore, in the projector 11 according to the embodiment of the invention, the calibration execution section 103A firstly executes the calibration to thereby obtain the coordinate conversion parameters representing the correspondence relationship between the coordinate in the shot image data and the coordinate in the area on the screen SC to be the object of the calibration. When the coordinate conversion parameters are obtained by the calibration execution section 103A, the coordinate calculation section 159 performs the conversion of the coordinate based on the coordinate conversion parameters to thereby obtain the first coordinate data. Further, the coordinate conversion section 160 converts the first coordinate data output from the coordinate conversion section 159 based on the image position information, and then outputs the coordinate data (the second coordinate data) thus converted to the output switching section 163.

The output switching section 163 has a function of selectively switching the output destination to which the coordinate data thus converted by the coordinate conversion section 160 is output, and in the present embodiment, selects either one of the external I/F 102 and the image processing unit 110 as the output destination, and then outputs the coordinate data. The output switching section 163 switches the output destination, to which the coordinate data thus converted is output, in accordance with the control of the output control section 101, and then outputs the coordinate data.

The display control section 107 draws the image of a pointer 12A on an image developed in the frame memory 115 in accordance with the indication position of the indication body 12 based on the coordinate data input from the output switching section 163.

Here, the coordinate calculation section 159 is also capable of outputting the first coordinate data to the output switching section 163 without the coordinate conversion section 160 intervening therebetween. Therefore, the output switching section 163 is capable of outputting the first coordinate data output by the coordinate calculation section 159 to the PC 13 via the external I/F 102 and also directly to the image processing section 113. Further, by adopting the configuration in which the coordinate conversion section 160 outputs the first coordinate data input from the coordinate calculation section 159 to the output switching section 163 without converting the first coordinate data, the same function and advantage as in the case in which the coordinate calculation section 159 outputs the coordinate data directly to the output switching section 163 can be obtained.

It should be noted that in the present embodiment although it is assumed in the present embodiment that the coordinate conversion section 160 performs the conversion in the case of outputting the coordinate data to the PC 13, but does not perform the conversion in the case of outputting the coordinate data to the image processing section 113, the configuration of the projector 11 is not limited thereto. It is also possible for the coordinate conversion section 160 to perform the conversion of the coordinate data in either of the case of outputting the coordinate data to the PC 13 and the case of outputting it to the image processing section 113. Further, the projector 11 can also adopt the configuration not provided with the coordinate conversion section 160. In this case, the first coordinate data output by the coordinate calculation section 159 is output to the PC 13 and the image processing section 113.

The coordinate data output by the output switching section 163 to the external I/F 102 is input to the PC 13 via, for example, the USB interface of the external I/F 102. The coordinate data output by the output switching section 163 is output to the PC 13 as similar data to the coordinate data output by a pointing device such as a mouse, a trackball, a digitizer, or a pen tablet.

If the PC 13 treats the coordinate data output from the output switching section 163 equivalently to coordinate data output by general-purpose pointing devices, a general-purpose device driver program corresponding to such general-purpose pointing devices can be used. In general, since such general-purpose device driver programs are previously installed as a part of the operating system (OS) of the PC 13, it is not necessary to further install a device driver program in the case of using the general-purpose device driver program. Further, since the general-purpose device driver program is used, it is not necessary to prepare a dedicated device driver program on the one hand, but the information which can be exchanged between the projector 11 and the PC 13 is limited to the range determined by the specification of the general-purpose device driver program on the other hand.

Further, it is also possible to prepare the dedicated device driver program corresponding to the projector 11, and then use the device driver program after installing it into the PC 13. In this case, the dedicated device driver program is required on the one hand, and the information which can be exchanged between the projector 11 and the PC 13 can arbitrarily be set in accordance with the specification of the dedicated device driver program.

Figure 3:
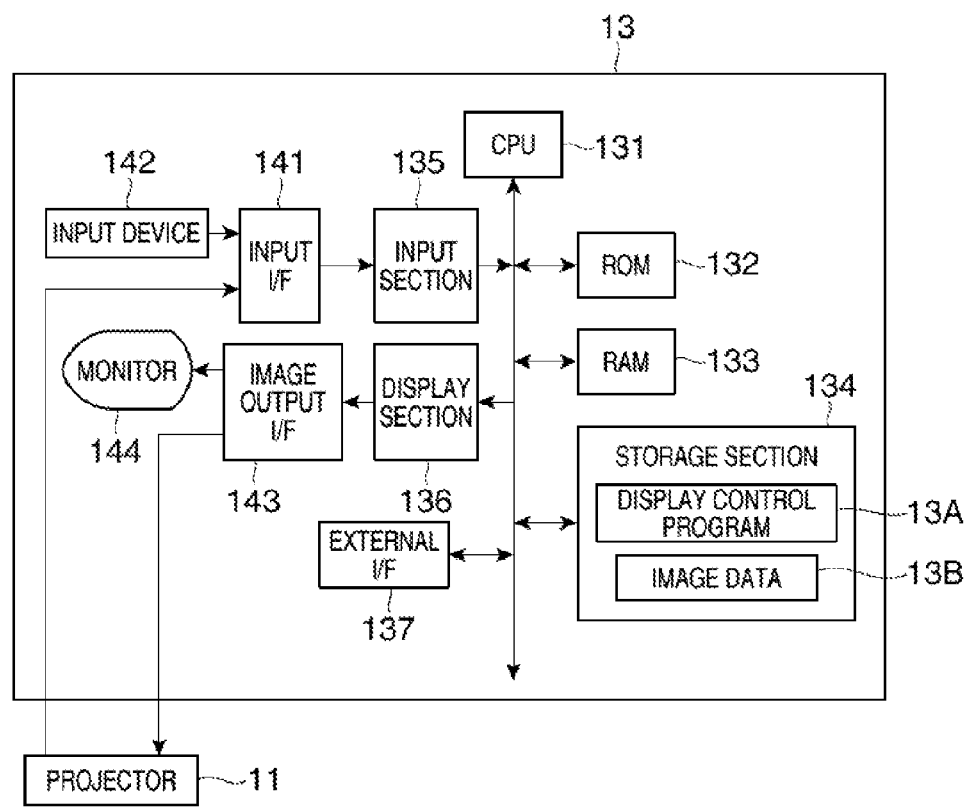
FIG. 3 is a block diagram showing a functional configuration of a PC.

FIG. 3 is a block diagram showing a functional configuration of the PC 13.

As shown in FIG. 3, the PC 13 is provided with a CPU 131 for executing a control program to centrally control each part of the PC 13, a ROM 132 storing a basic control program to be executed by the CPU 131 and the data related to the program, a RAM 133 for temporarily storing the programs to be executed by the CPU 131 and the data, a storage section 134 for storing the programs and data in a non-volatile manner, an input section 135 for detecting input operations and outputting data and operation signals representing the input content to the CPU 131, a display section 136 for outputting display data for displaying the processing result or the like by the CPU 131, and an external I/F 137 for transmitting/receiving the data and so on to/from an external device, and these sections are connected to each other through a bus.

The input section 135 has an input I/F 141 having a connector and a power supply circuit, and an input device 142 is connected to the input I/F 141. The input I/F 141 is formed of a general-purpose interface for an input device such as a USB interface, and the input device 142 corresponds to a pointing device such as a keyboard, a mouse, or a digitizer.

A communication cable (e.g., a USB cable 62) connected to the projector 11 is connected to the input I/F 141, and the coordinate data (the first coordinate data, or the second coordinate data) representing the coordinate of the indication position of the indication body 12 is input to the input I/F 141 from the projector 11. Here, the coordinate data output by the projector 11 is input to the input I/F 141 as the similar data to the coordinate data output by a pointing device such as a mouse, a trackball, a digitizer, or a pen tablet. Therefore, the PC 13 can process the coordinate data input from the projector 11 as an input signal from the input device, and can perform an operation of, for example, performing the translation of a mouse cursor or a pointer based on the coordinate data.

The display section 136 has an image output I/F 143 provided with a connector for outputting the image data, and a cable (e.g., the RGB cable 61) for transmitting the image data to be connected to a monitor 144 and the projector 11 is connected to the image output I/F 143. The image output I/F 143 is provided with, for example, a plurality of VGA terminals for outputting analog image data, DVI interfaces, USB interfaces, and LAN interfaces each for outputting digital image data, S-video terminals for outputting a composite video signal such as NTSC, PAL, or SECAM, RCA terminals for outputting a composite video signal, D-terminals for outputting a component video signal, and HDMI (registered trademark) connectors compliant with the HDMI standard, and the monitor 144 and projector 11 are connected respectively to these connectors. Further, there can also be adopted a configuration in which the image output I/F 143 is provided with a DisplayPort developed by VESA, and specifically, there can also be adopted a configuration in which the image output I/F 143 is provided with the DisplayPort connector or the Mini-DisplayPort connector and an interface circuit compliant with the DisplayPort standard. In this case, the PC 13 can output the digital image data to the projector 11, the monitor 144, or other devices via the DisplayPort. It should be noted that it is also possible for the image output I/F 143 to perform transmission/reception of the image data with wired communication, or to perform transmission/reception of the image data with wireless communication.

The storage section 134 stores a display control program 13A to be executed by the CPU 131, and image data 13B to be output when executing the display control program 13A. When executing the display control program 13A, the CPU 131 performs a process of transmitting the image data 13B to the projector 11. In this process, the CPU 131 displays the image data 13B on the monitor 144, and at the same time makes the display section 136 generate the image data with a predetermined display resolution and then output it to the image output I/F 143. Here, the display section 136 outputs analog image data to a connector for outputting analog image data, and outputs digital image data to a connector for outputting digital data. The image data 13B can be the image data obtained by capturing the screen, which the PC 13 makes the monitor 144 display.

Further, the CPU 131 generates an image for displaying the pointer 12A (FIG. 1) at a position corresponding to the coordinate data corresponding to an operation of the pointing device if the coordinate data is input from the input section 135 during the execution of the display control program 13A. Then, the CPU 131 generates the image data having the pointer 12A superimposed on the image data 13B presently reproduced, and then outputs the image data to the projector 11 from the image output I/F 143.

Further, the display control program 13A is a program for controlling the projector having a function of controlling the projector 11 to instruct to perform the multi-screen display or to designate the area where the input image of the PC 13 is displayed when performing the multi-screen display. By executing the display control program 13A, the PC 13 not only outputs the image to the projector 11, but also transmits/receives a variety of types of control data. Therefore, it is also possible, for example, for the CPU 131 to generate the image having the trajectory of the operation of the indication body 12 drawn with a line based on the coordinate data input from the projector 11 to the input I/F 141, and then output to the projector 11.

Figure 4A:
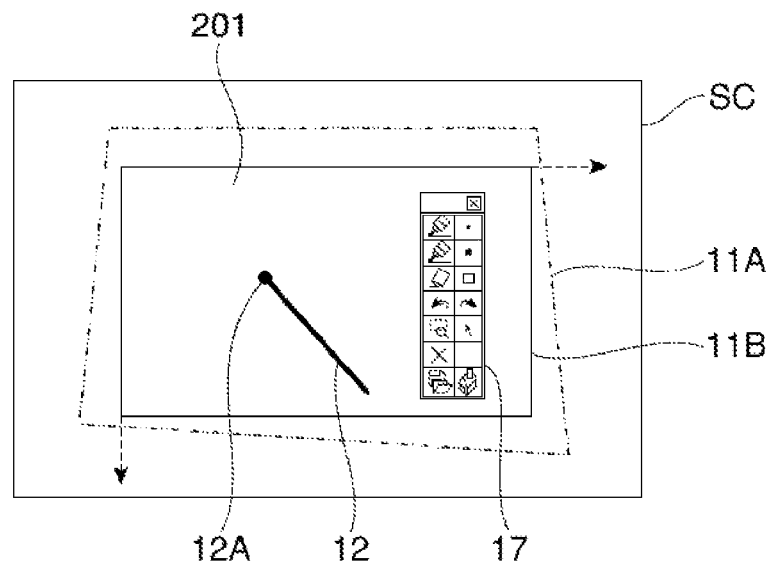
Figure 4B:
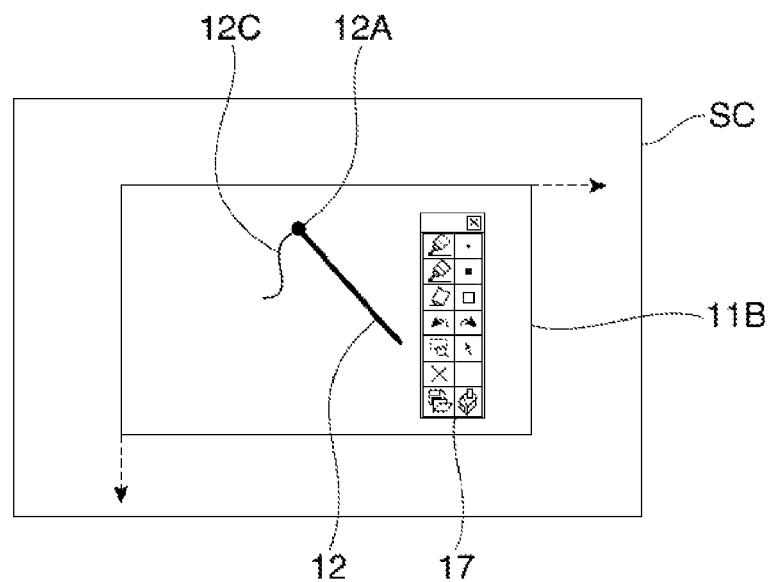

FIGS. 4A and 4B are diagrams showing an example of projecting an image on a screen SC by the projector 11, wherein FIG. 4A shows a state of projecting the pointer 12A in accordance with the indication position of the indication body 12, and FIG. 4B shows a state in which a drawn FIG. 12C is drawn in accordance with the indication position.

If the display image is projected using the entire modulation area of the light modulation device 32, the image is formed in the projection-allowable area 11A indicated by the dashed-two dotted line in FIG. 4A. Since the keystone distortion is generated in the projection-allowable area 11A as shown in FIG. 4A except the case in which the projector 11 is located right in front of the screen SC, the projector 11 performs the keystone correction due to the function of the display control section 107. After performing the keystone correction, the display image is projected in the actual projection area 11B as a part of the projection-allowable area 11A. The actual projection area 11B is normally set to have a rectangular shape on the screen SC, and have the maximum size within the projection-allowable area 11A. Specifically, the actual projection area 11B is determined based on the resolution (the resolution of the liquid crystal panel) of the modulation area of the light modulation device 32 and the extent of the keystone distortion, and is not necessarily required to have the maximum size. It should be noted that if the keystone distortion does not occur in the image projected from the projector 11, execution of the keystone correction is not required. In this case, the actual projection area 11B coincides with the projection-allowable area 11A.

The calibration execution section 103A of the projector 11 performs the calibration in the actual projection area 11B on which the keystone correction has been performed. In the calibration, the calibration execution section 103A controls the image processing section 113 to draw a predetermined image for calibration. In the state in which the image for calibration is projected on the screen SC, the position detection unit 150 shoots the screen SC under the control of the calibration execution section 103A. The image for calibration is, for example, an image with dots arranged on the white background, and is stored in advance in the storage section 105 and so on. It should be noted that the image for calibration is not necessarily required to be stored in the storage section 105 or the like, it is also possible to adopt the configuration in which the calibration execution section 103A generates the image for calibration on a case-by-case basis every time necessity of the execution of the calibration arises and the calibration is performed.

The area in the screen SC to be the object of the calibration can be the entire actual projection area 11B or a part of the actual projection area 11B. As the case of setting a part of the actual projection area 11B to the object of the calibration, there can be cited the case in which the display is performed so that the vertical width of the image to be displayed by the projector 11 coincides with the vertical width of the screen SC while the aspect ratio of the image to be displayed by the projector 11 and the aspect ratio of the screen SC are different from each other (e.g., the resolution of the image to be displayed by the projector 11 is WXGA, and the aspect ratio of the screen SC is 4:3). In this example, right and left parts of the actual projection area 11B of the projector 11 are located outside the screen SC. Therefore, it is possible to take the area included in the screen SC out of the actual projection area 11B of the projector 11 as the object of the calibration, and exclude the other area from the object of the calibration.

The calibration execution section 103A detects the outline of the display image in the shot image data, namely the boundary between the outside of the actual projection area 11B and the actual projection area 11B, and the dots in the shot image data, and then identifies the correspondence relationship between positions in the shooting range (field angle) of the position detection unit 150, namely the positions in the shot image data, and positions on the actual projection area 11B. The calibration execution section 103A obtains the coordinate conversion parameters to be used by the coordinate calculation section 159 based on the correspondence relationship between the positions on the shot image and the positions on the actual projection area 11B identified by the calibration. The coordinate conversion parameters include, for example, the data for making the correspondence between the coordinate in the area (the actual projection area 11B) on the screen SC to be the object of the calibration and the coordinate obtained on the shot image data. The coordinate calculation section 159 can convert the coordinate obtained on the shot image data into the coordinate in the actual projection area 11B based on the coordinate conversion parameter. The coordinate calculation process is performed based on the coordinate conversion parameter. It should be noted that since the image modulated in the modulation area of the light modulation device 32 is displayed on the screen SC, it is also possible to regard the coordinate conversion parameters as the parameters for representing the correspondence relationship between the coordinate in the shot image data and the coordinate in the modulation area of the light modulation device 32.

Since the calibration is performed by the control section 103 executing a calibration program (not shown) stored in the storage section 105, it is not required to install and execute the calibration program in the PC 13. Further, the calibration can be the process automatically performed by the calibration execution section 103A based on the shot image data, or can be the process requiring an operation of the user to the image for calibration. Further, it is also possible for the projector 11 to use both of these processes. As the operation by the user to the image for calibration, there can be cited, for example, an operation of the user to indicate the dot included in the image for calibration with the indication body 12.

The position detection unit 150 provided to the projector 11 performs the shooting in the state in which the image is projected in the actual projection area 11B, virtually sets the Cartesian coordinates taking a corner (the upper left vertex) of the actual projection area 11B as the origin as indicated by the dotted arrows in the drawings, and obtains the coordinate of the tip position of the indication body 12 in the coordinate system. The Cartesian coordinates are set based on the coordinate conversion parameters, which can be obtained by the calibration described above. Subsequently, when the coordinate of the tip of the indication body 12 in the image data displayed in the actual projection area 11B is obtained by the coordinate conversion section 160, the pointer 12A and the menu bar 17 shown in FIG. 4A are displayed in accordance with the coordinate. The pointer 12A is drawn as a symbol indicating the tip position of the indication body 12. Further, the menu bar 17 is a GUI which can be operated by the indication body 12, and by pointing the button disposed in the menu bar 17 with the indication body 12, the GUI operations for performing the functions of drawing of a figure such as a line, storing, deleting, copying, and so on of the data of the figure thus drawn can be performed. As a specific example, by moving the indication body 12 from the position shown in FIG. 4A to the position in FIG. 4B, the drawn FIG. 12C is drawn along the trajectory of the tip of the indication body 12. Similarly to, for example, the pointer 12A and the menu bar 17, the drawn FIG. 12C is drawn by the display control section 107 in accordance with the coordinate data representing the indication position of the indication body 12 so as to be superimposed on the image developed by the image processing section 113 on the frame memory 115. Alternatively, the PC 13 draws the drawn FIG. 12C, and then outputs the input image, on which the drawn FIG. 12C is superimposed, to the projector 11. The configuration of the menu bar 17 and the function performed in accordance with the operation of the menu bar 17 will be described later.

Figure 5A:
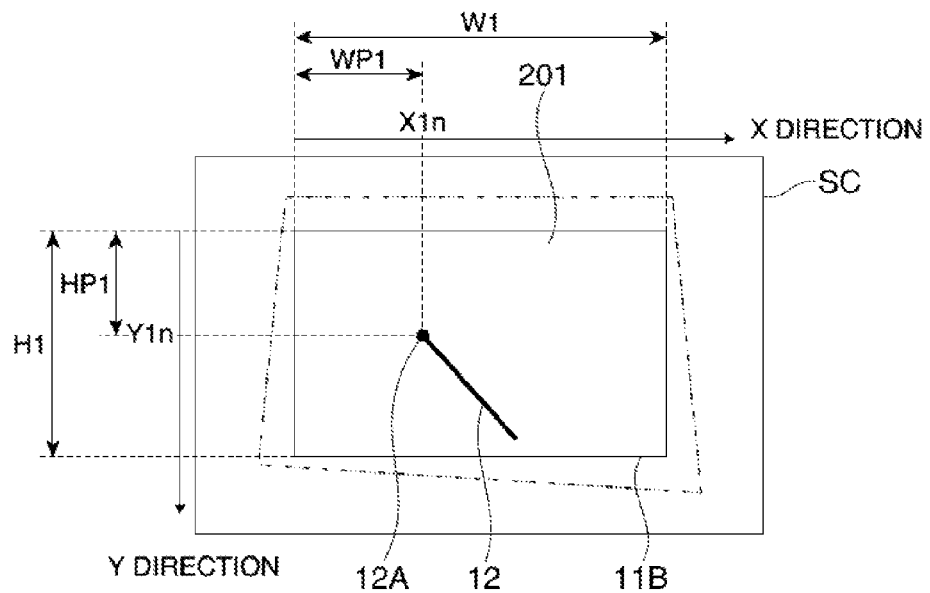
FIGS. 5A and 5B are explanatory diagrams showing the procedure of the process of detecting and converting the coordinate.
Figure 5B:
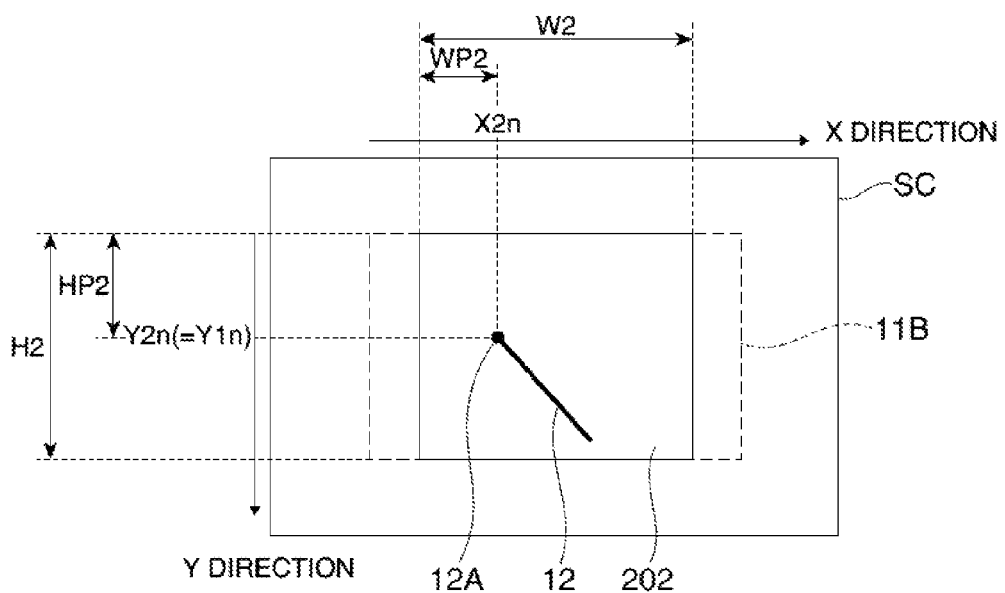

FIGS. 5A and 5B are explanatory diagrams showing how the projector 11 performs the process of detecting the coordinate of the indication position, and then converting it into the coordinate in the image data, wherein FIG. 5A shows the initial state of the series of operations, and FIG. 5B shows the state in which the PC 13 has changed the resolution of the display image from the state shown in FIG. 5A. It should be noted that in the explanation below, there will be explained the case in which no keystone distortion occurs in the image projected by the projector 11, and the image displayed in the entire modulation area of the light modulation device 32 is displayed in the actual projection area 11B. In this case, the actual projection area 11B coincides with the projection-allowable area 11A, and the resolution of the image displayed in the actual projection area 11B is equal to the resolution of the liquid crystal panel of the light modulation device 32.

In the example shown in FIG. 5A, the resolution of the liquid crystal panel of the light modulation device 32 and the resolution of the image displayed in the actual projection area 11B are both 1280×800 dots. Further, the resolution of the image data input from the PC 13 is also 1280×800 dots. Therefore, in the actual projection area 11B, the display image 201 with the resolution of 1280×800 dots is displayed. The position detection unit 150 sets the X-Y Cartesian coordinate system taking the upper left corner of the actual projection area 11B as the origin, the rightward direction as the X-axis direction, and the downward direction as the Y-axis direction, and assumes that the coordinate of the indication position of the indication body 12 in the actual projection area 11B is (X1n, Y1n). The first coordinate data output by the coordinate calculation section 159 represents the coordinate (X1n, Y1n) of the indication position.

The coordinate (X1n, Y1n) of the indication position is a coordinate (normalized coordinate) normalized in the actual projection area 11B. Specifically, the coordinate X1n of the indication position in the X-axis direction represents the ratio of the length WP1 from the left side of the actual projection area 11B to the indication position with respect to the lateral width W1 of the actual projection area 11B. Further, the coordinate Y1n of the indication position in the Y-axis direction represents the ratio of the length HP1 from the upper side of the actual projection area 11B to the indication position with respect to the vertical width H1 of the actual projection area 11B. It should be noted here that the values W1, WP1, H1, and HP1 are expressed with the number of pixels.

In this case, the coordinate (X1n, Y1n) is calculated by the formulas 1, 2 described below.

$$X1n = WP1 \div W1 \tag{1}$$

$$Y1n = HP1 \div H1 \tag{2}$$

For example, in the example shown in FIG. 5A, WP1=400 and HP1=300 are assumed. Since the resolution of the display image 201 is 1280×800 dots, W1=1280 and H1=800 are true. Therefore, the expressions of X1n=400÷1280≈0.313 and Y1n=300÷800≈0.375 can be obtained. Further, in this case, the coordinates of the upper left vertex of the actual projection area 11B, the upper right vertex thereof, the lower left vertex thereof, and the lower right vertex thereof are expressed as (0, 0), (1, 0), (0, 1), and (1, 1), respectively. It should be noted that in the state shown in FIG. 5A since the actual projection area 11B and the area in which the display image 201 is displayed coincide with each other, the coordinates (X1n, Y1n) can also be regarded as the coordinates normalized in the display image 201.

Here, if the image data input from the PC 13 is switched to the image data with the resolution of 1024×768 dots, the projector 11 scales the image data so that the vertical resolution (768 dots) of the image data is increased to the vertical resolution (800 dots) of the liquid crystal panel. Since the scaling is performed in both of the vertical direction and the horizontal direction in a similar manner, the horizontal resolution (1024 dots) of the image data is scaled to 1024×(800÷768)≈1066 dots. As a result, as shown in FIG. 5B, the display image 202 with the resolution of 1066×800 dots is projected on the screen SC. The image data with the resolution of 1066×800 dots is the image data enlarged while keeping the aspect ratio of 1024×768 dots as input from the PC 13. Since the aspect ratio and the resolution of the display image 202 are different from the aspect ratio and the resolution of the display image 201, the area in which the display image 202 is projected does not coincide with the actual projection area 11B. In the example shown in FIG. 5B, the area in which the display image 202 is projected is smaller than the actual projection area 11B. Further, the projector 11 changes the position so that the image thus scaled is displayed at a position near to the center as much as possible. Therefore, in the actual projection area 11B, the position of the upper left vertex of the display image 201 and the position of the upper left vertex of the display image 202 do not coincide with each other.

Here, as shown in FIGS. 5A and 5B, when switching the display image 201 to the display image 202 in the state in which the indication body 12 on the screen SC is fixed, the relative position between the indication position and the image displayed varies although the indication position itself is not moved. Therefore, the coordinate (X1n, Y1n) of the indication position normalized taking the upper left vertex of the display image 201 as the origin and the coordinate (X2n, Y2n) of the indication position normalized taking the upper left vertex of the display image 202 as the origin are different from each other. Therefore, if the pointer 12A is displayed based on the coordinate (X1n, Y1n) of the indication position in the actual projection area 11B, which the position detection unit 150 has calculated based on the shot image data of the imaging section 153, the pointer 12A is shifted from the actual indication position.

In the example shown in FIG. 5B, for example, the upper left vertex of the display image 202 is located at a position shifted 107 (=(1280−1066)÷2) pixels rightward from the upper left vertex of the display image 201. Therefore, defining that the length from the left side of the display image 202 to the indication position is WP2, and the length from the upper side of the display image 202 to the indication position is HP2, WP2=WP1−107=400−107=293 and HP2=HP1=300 are obtained. Further, since the resolution of the display image 202 is 1066×800 dots, the lateral width W2 and the vertical width H2 of the display image 202 are W2=1066 and H2=800, respectively. Therefore, the coordinate (X2n, Y2n) of the indication position normalized taking the upper left vertex of the display image 202 as the origin is expressed as X2n=(400−107)÷1066≈0.275, Y2n=300÷800=0.375. As described above, X1n≠X2n is resulted, and if the resolution of the display image is changed, the normalized coordinate of the indication position is also changed.

Therefore, if the pointer 12A is displayed at the coordinate (X1n, Y1n)=(0.313, 0.375) in the coordinate system taking the upper left corner of the display image 202 having been changed as the origin, the pointer 12A is displayed at the position separate from the tip of the indication body 12. This is because the PC 13 or the display control section 107 performs the drawing taking the upper left of the image as the origin based on the normalized coordinate output from the position detection unit 150 when drawing the pointer 12A. As described above, since the coordinate obtained taking the actual projection area 11B as a reference is affected by the resolution of the display image, it is not achievable for the PC 13 or the display control section 107 to directly use the coordinate calculated by the position detection unit 150 to the display of the pointer 12A.

Therefore, the projector 11 performs the process of converting the coordinate (X1n, Y1n) of the indication position calculated by the coordinate calculation section 159 of the position detection unit 150 into the coordinate (X2n, Y2n) of the indication position in the display image presently displayed using the coordinate conversion section 160 so as to be able to cope with the case in which the resolution of the display image output by the PC 13 has changed.

The coordinate conversion section 160 converts the coordinate (X1n, Y1n) into the coordinate (X2n, Y2n) based on the image position information input from the image processing section 113. The image position information is the information related to the configuration of the image in the modulation area of the light modulation device 32. Further, the modulation area of the light modulation device 32 corresponds to the actual projection area 11B on the screen SC. Therefore, the image position information represents the position (configuration) of the display image with respect to the actual projection area 11B. In the present embodiment, the image position information represents the position (configuration) and the size of the display image with respect to the actual projection area 11B. Based on the image position information, the coordinate conversion section 160 obtains the coordinate of the indication position in the display image. For example, in the example shown in FIGS. 5A and 5B, the values W1, H1, W2, and H2 correspond to the image position information. Further, the coordinate (XO1, YO1)=(0, 0) of the upper left end of the display image 201 and the coordinate (XO2, YO2)=(107, 0) of the upper left end of the display image 202 also correspond to the image position information. It should be noted that the coordinates XO1, YO1, XO2, and YO2 are not the normalized coordinates, but are those representing the positions of the upper left vertex of the display image with the number of pixels taking the upper left vertex (or the upper left vertex of the modulation area of the light modulation device 32) of the actual projection area 11B as the origin in the actual projection area 11B (or the modulation area of the light modulation device 32). In the example shown in FIGS. 5A and 5B, the image position information of the display image 201 (XO1, YO1, W1, H1)=(0, 0, 1280, 800) is obtained, and the image position information of the display image 202 (XO2, YO2, W2, H2)=(107, 0, 1166, 800) is obtained.

The coordinate (X2n, Y2n) calculated by the coordinate calculation section 160 can be used as the information for identifying the position in the image data when the PC 13 or the display control section 107 draws the pointer 12A, the menu bar 17, or the drawn FIG. 12C in the image data as the processing object. Therefore, the pointer 12A, the drawn FIG. 12C, and the menu bar 17 can accurately be drawn in accordance with the indication position by the indication body 12 without being affected by the resolution of the display image, the zooming ratio, and so on.

The position and the size of the display image displayed in the actual projection area 11B are affected by the resolution of the display image and the display position. For example, in the case in which the projector 11 performs the process of changing the projection state such as change in the display resolution, change in the aspect ratio, zooming, change (translation) in the display position of the image, or multi-screen display process in accordance with an operation by the operation panel 41 or the remote control receiver 45, or a control signal transmitted from the PC 13, the image position information is also changed. As described above, the image position information is the information related to the configuration of the image placement area (the area in which the display images 201, 202 are projected (displayed)) with respect to the actual projection area 11B. In other words, the image position information is the information representing the position (configuration) of the display image with respect to the actual projection area 11B (the display-allowable area). Further, the image position information also varies in the case (e.g., the case in which the setting with respect to the resolution is changed in the PC 13) in which the display resolution of the PC 13 is varied, and the resolution of the image data output by the PC 13 to the projector 11 is varied.

The coordinate conversion section 160 obtains the information from the control section 103 and the image processing unit 110 to update the image position information, and then converts the coordinate based on the image position information thus updated every time the projection state (the display state) of the display image by the projection section 30 is varied. The image position information is updated at, for example, the timings cited below.

The control section 103 has detected the input of the image data from the PC 13.

The control section 103 has detected the change in the information (e.g., the resolution of the image) related to the image data input from the PC 13.

The resolution of the image data has changed in the projector 11.

The aspect ratio of the image data has changed in the projector 11.

The digital zoom function of expanding/contracting the image to be drawn by the light modulation device 32 using the image processing of the image data to be projected has been executed or canceled.

The display position of the display image with respect to the actual projection area 11B has been changed.

The image has been enlarged by the digital zoom function described above, and then the function of changing the display position of the image using the image processing has been executed or canceled.

The Tele/Wide function for expanding/contracting the projection size of the whole including the image drawn by the light modulation device 32 and the background, namely the entire actual projection area 11B, by performing the image processing on the image data has been executed or canceled.

The image has been contracted by the digital zoom function described above, and then the picture shift function of changing the display position of the image using the image processing has been executed or canceled.

The simultaneous display of a plurality of images has been executed or canceled.

The output destination to which the coordinate is output from the output switching section 163 has been changed from the image processing unit 110 to the PC 13 or vice versa.

The change in the resolution, the change in the aspect ratio, and the execution and cancellation of the variety of functions are all executed by the image processing unit 110 under the control of the control section 103. It should be noted that the timings cited above are nothing more than examples, and it is obviously possible to update the image position information at other timings.

Figure 6:
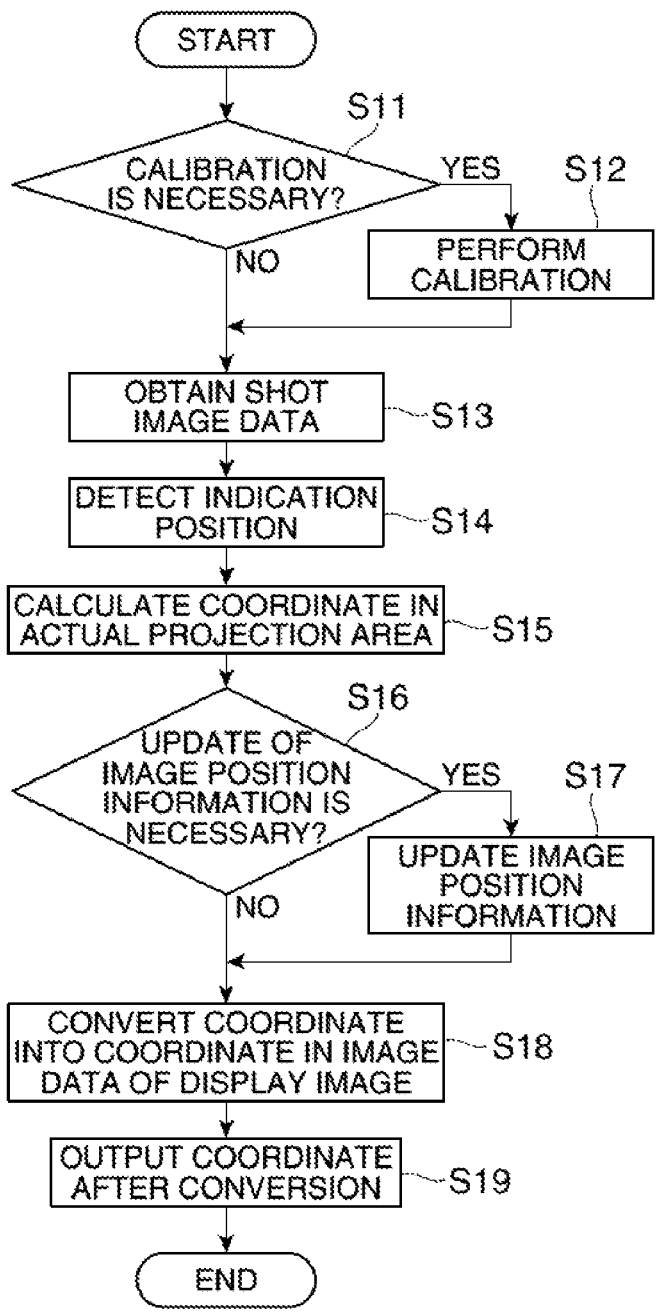
FIG. 6 is a flowchart showing an operation of the projector.

FIG. 6 is a flowchart showing the operation of the projector 11, and in particular showing the operation of detecting the indication position by the indication body 12 and then outputting the coordinate of the indication position.

The operation shown in FIG. 6 is repeatedly executed at every fixed time interval after starting up the projector 11, or in the case in which the display of the pointer 12A or the menu bar 17 is instructed by the operation on the operation panel 41 or the remote control receiver 45, and in the case in which the position detection is instructed using the operation panel 41 or the remote control receiver 45.

Firstly, whether or not the calibration is necessary is determined (step S11). This determination can also be performed based on the instruction of the user expressing whether or not the calibration is necessary, or it is also possible that the calibration execution section 103A automatically determines whether or not the calibration is necessary to be performed, and the determination is performed automatically based on the determination result. If the calibration is necessary (YES in the step S11), the calibration is performed (step S12) as explained with reference to FIG. 4A. Specifically, by making the image processing section 113 draw the image for calibration, making the position detection unit 150 perform shooting in the state in which the image for calibration is projected, and then detecting the outline of the actual projection area 11B in the shot image data thus obtained and the characteristic points (e.g., the dots) included in the image for calibration, the correspondence relationship between the image drawn by the image processing section 113 and the shot image data is obtained. It should be noted that it is sufficient to perform the calibration once after starting the use of the projector 11, and it is not necessary to perform the calibration once again unless a specific event occurs. It is necessary to newly perform the calibration in, for example, the cases 1 through 3 below.

(1) The keystone correction is performed.

(2) The installation conditions of the projector 11 have changed. For example, the relative position (including the orientation) of the projector 11 with respect to the screen SC has changed.

(3) Optical conditions have changed. For example, the state of focus or zoom of the projection optical system 33 has changed. The optical axis of the projection optical system 33 or the imaging section 153 is shifted due to temporal change thereof and so on.

If any of these events occurs, since the correspondence relationship between the position on the shot image data and the position on the image drawn by the image processing section 113 in the initial state, which forms the basis for the coordinate conversion section 160 to calculate the coordinate, is changed, it is necessary to newly perform the calibration. In contrast, since it is not necessary to perform the calibration once again unless any of these events occurs, if the events described above have not occurred during the period from when the projector 11 is used previously to when the projector 11 is used this time, the coordinate conversion parameters obtained in the previous calibration can also be reused without newly performing the calibration. As the method for the calibration execution section 103A to determine whether or not the calibration is necessary to be performed, there can be cited, for example, a method of making the determination based on the presence or absence of the operation of the switch instructing the execution of the keystone correction in the operation panel 41, and a method of providing a sensor for detecting the tilt and the movement to the projector 11, and making the determination based on the variation in the detection value of the sensor. Further, it is also possible that the calibration execution section 103A automatically performs the calibration if the focus adjustment or the zoom adjustment in the projection optical system 33 is performed. Further, it is also possible to provide a dedicated switch to the operation section of, for example, the operation panel 41 and the remote controller so that the user figures out the change in the installation position of the projector 11 and the optical conditions, and can perform the operation of instructing the execution of the calibration.

When the shooting control section 155 makes the imaging section 153 shoot the range including the actual projection area 11B under the control of the control section 103, the position detection processing section 157 obtains (step S13) the shot image data, and then detects (step S14) the indication position of the indication body 12 based on the shot image data. Subsequently, the coordinate calculation section 159 calculates (step S15) the coordinate of the indication position detected by the position detection processing section 157.

The coordinate calculated in the step S13 is the coordinate in the actual projection area 11B, and corresponds to the coordinate (X1n, Y1n) explained with reference to FIG. 5A.

The coordinate conversion section 160 determines (step S16) whether or not the update of the image position information is necessary, and then obtains the information from the control section 103 and the image processing unit 110, and updates (step S17) the image position information if it is necessary. The timing of the process of the step S17 is not limited to the posterior stage of the step S15, but the process of the step S17 can also be performed at the timings described above as an example.

Subsequently, the coordinate conversion section 160 performs the process for converting the coordinate calculated by the coordinate calculation section 159 into the coordinate in the image data of the display image, and then outputs (step S18) the coordinate after the conversion to the output switching section 163. The coordinate after the conversion corresponds to the coordinate (X2n, Y2n) explained with reference to FIG. 5B.

The output switching section 163 outputs (step S19) the coordinate after the conversion to the designated one of the external I/F 102 and the image processing unit 110, and then terminates the present process.

The output control section 101 controls the output switching section 163 to perform the control of switching the output of the coordinate having been converted by the coordinate conversion section 160. The output control section 101 makes the output switching section 163 select the PC 13 supplying the input image presently displayed by the projection section 30 out of the image sources connected to the external I/F 102 as the output destination to which the coordinate calculated by the coordinate conversion section 160 is output. Further, it is also possible for the output control section 101 to make the output switching section 163 select the image processing unit 110 as the output destination thereof.

Further, the output control section 101 has the function of identifying the image source supplying the image presently displayed in order to determine the image source to be the output destination to which the coordinate converted by the coordinate conversion section 160 is output.

Further, the control section 103 temporarily halts the projection to the screen SC if AV mute (a function of temporarily halting the projection of the image by the projector 11) is instructed due to the operation detected by the operation panel 41 or the remote control receiver 45. In this case, the control section 103 functions as a display halt controller. Specifically, when detecting the instruction of the AV mute, the control section 103 makes the display control section 107 switch the display data to be output to the light modulation device drive section 119 to the data representing the all-black display. Since all of the pixels of the liquid crystal panel of the light modulation device 32 are set to the black display due to this operation, and the transmittance of the light modulation device 32 is reduced to a nearly zero level, no image is projected on the screen SC, and the light intensity of the projection light is also reduced to a nearly zero level. It is also possible for the control section 103 to control the light source drive section 117 to reduce the light intensity of the light source provided to the light source drive section 117 in conjunction with this operation. Subsequently, when the cancellation of the AV mute is instructed by the operation detected by the operation panel 41 or the remote control receiver 45, the control section 103 controls the display control section 107 to restore the light modulation device 32 to a normal display state, and restores the luminance of the light source of the light source drive section 117 to the luminance in the normal state if necessary.

In the display system 10, the PC 13 can perform the function of drawing the pointer 12A, the menu bar 17 described later, or the drawn FIG. 12C so as to be superimposed on the image data to be output to the projector 11. Further, as shown in FIG. 2, the output switching section 163 of the projector 11 is capable of outputting the coordinate generated by the coordinate conversion section 160 to the image processing unit 110, and it is also possible for the image processing unit 110 to draw the pointer 12A, the menu bar 17 described later, or the drawn FIG. 12C based on the coordinate, and then project them while superimposing them on the image presently projected. Here, the operation mode in which the image processing unit 110 performs the drawing is defined as a "PJ interactive mode," and the operation mode in which the PC 13 performs the drawing is defined as a "PC interactive mode."

In the PJ interactive mode, the projector 11 performs the process based on the coordinate of the indication position of the indication body 12 output by the coordinate conversion section 160, and the projector 11 displays the pointer 12A and the menu bar 17 so as to follow the indication position of the indication body 12, and then performs the process of translating the display positions.

In contrast, in the PC interactive mode, by the PC 13 treating the coordinate data output by the output switching section 163 equivalently to the coordinate data output by a general-purpose pointing device, the indication operation by the indication body 12 can be processed as the operation of the pointing device using the general-purpose device driver program previously installed as a part of the function of the OS of the PC 13 as described above. For example, a process of displaying the pointer 12A and the menu bar 17 and translating the display position so as to follow the indication position of the indication body 12 can be performed. Further, by adopting the configuration in which the PC 13 executes the dedicated device driver program corresponding to the projector 11, a unique function can be realized in addition to the function provided to the OS of the PC 13. For example, it becomes possible to control the operation of the projector 11 based on the indication operation by the indication body 12 to thereby perform starting/stopping of the execution of a specific function (e.g., the AV mute function and the multi-screen display function), and control of the function during the execution. The unique function can arbitrarily be set by the specification of the dedicated device driver program. It is also possible to adopt the configuration in which the projector 11 displays the menu bar 17 in accordance with the control of the PC 13 in the PC interactive mode. In this case, it is also possible for the projector 11 to output the coordinate of the display position of the menu bar 17 in the input image from the PC 13 from the output switching section 163.

In the PJ interactive mode, the image processing unit 110 functions as a processing section and performs a process such as drawing based on the coordinate of the indication position input from the coordinate conversion section 160. Further, in the PC interactive mode, the output switching section 163 functions as a processing section, and performs the process of outputting the position coordinate, which is input from the coordinate conversion section 160, to the PC 13.

As described above, at least a part of the interfaces provided to the external I/F 102 is made to correspond to the operation modes (the PJ interactive mode, the PC interactive mode) of the projector 11, and setting data 105B stored in the storage section 105 includes the information for making the operation modes and the output destination, to which the output switching section 163 outputs the coordinate data, correspond to each other. In the PC interactive mode, the coordinate needs to be output to the PC 13, and in the PJ interactive mode, the coordinate needs to be output to the image processing unit 110. Therefore, the output control section 101 controls the output switching section 163 in accordance with the setting of the setting data 105B based on the operation mode of the projector 11 to switch the output destination of the coordinate data.

Although it is possible to perform the switching between the PJ interactive mode and the PC interactive mode using the operation of the operation panel 41 or the remote controller as a trigger, it is also possible, for example, to provide a button for switching between the PJ interactive mode and the PC interactive mode to the menu bar 17, and to switch the operation mode when the user operates the button with the indication body 12, and the projector 11 detects the operation, using the detection as a trigger. In this case, it is also possible to switch the output destination of the coordinate data in conjunction with the switching of the operation mode from the PJ interactive mode to the PC interactive mode or vice versa.

Here, the menu bar 17 will be described in detail.

Figure 7A:
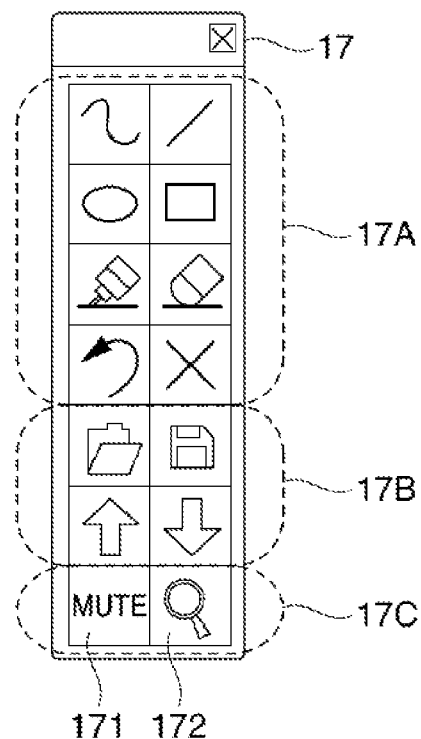
Figure 7B:
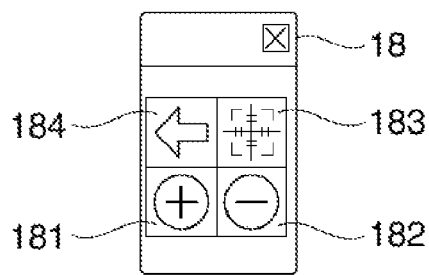

FIGS. 7A and 7B are diagrams showing a configuration example of the menu bar and a tool bar to be projected on the screen SC, wherein FIG. 7A shows a configuration example of the menu bar 17, and FIG. 7B shows a configuration example of a zoom tool bar 18 to be projected by the operation of the menu bar 17.

The menu bar 17 exemplified in FIG. 7A is provided with a plurality of buttons, and each of the buttons falls into the general classification of a drawing tool group 17A, a file operation group 17B, and a projection configuration control group 17C.

The drawing tool group 17A consists of the buttons for instructing drawing functions, and includes the buttons for instructing drawing of a figure (a curved line, a straight line, a circle, an ellipse, a quadrangle), coloring of a drawn figure, partial deletion of a drawn figure, undo of a process, deletion of the entire drawn figure, and so on. The functions corresponding to the buttons of the drawing tool group 17A are performed by the projector 11 in the PJ interactive mode, and are performed by the PC 13 in the PC interactive mode.

Further, the file operation group 17B includes the buttons for instructing a function of opening an image data file, a function of storing the drawn figure or the entire image presently projected including the drawn figure as image data, a function of performing the slide show described above by alternatively opening one image data file after another, and so on.

Further, the projection configuration control group 17C is provided with an AV mute button 171 for instructing the start of the AV mute described above, and a zoom button 172 for instructing the start of the zoom function described above.

In the case in which the coordinate of the indication position of the indication body 12 detected by the position detection unit 150 overlaps the coordinate of the display position of the button of the drawing tool group 17A or the file operation group 17B, the function corresponding to the button overlapping the indication position is performed.

In the PC interactive mode, the menu bar 17 is projected (displayed) due to the function of the PC 13. Therefore, in the PC interactive mode, the CPU 131 of the PC 13 determines the presence or absence of the operation to the buttons disposed in the menu bar 17. The CPU 131 discriminates whether or not the coordinate input from the projector 11 via the USB cable 62 overlaps the coordinate at which the menu bar 17 is drawn, and if it overlaps the menu bar 17, the CPU 131 identifies the button overlapping the coordinate input from the projector 11. Then, the CPU 131 performs the drawing function or the function of the file operation corresponding to the button thus identified.

Further, in the PJ interactive mode, since the menu bar 17 is projected (displayed) due to the function of the image processing unit 110, the control section 103 and the image processing unit 110 determine the presence or absence of the operation to the buttons disposed in the menu bar 17 in cooperation with each other. The control section 103 discriminates whether or not the coordinate input from the output switching section 163 overlaps the coordinate at which the menu bar 17 is drawn, and if it overlaps the menu bar 17, the control section 103 identifies the button overlapping the coordinate input from the output switching section 163. Then, the image processing unit 110 performs the drawing function or the function of the file operation corresponding to the button thus identified.

Further, the AV mute function corresponding to the AV mute button 171 and the zoom function corresponding to the zoom button 172 are functions provided to the projector 11. In the case in which the AV mute button 171 is operated by the indication body 12 in the PJ interactive mode, all of the pixels of the liquid crystal panel of the light modulation device 32 are set to the black display due to the control of the control section 103, the light intensity of the light source provided to the light source drive section 117 is reduced, and the projection of the image to the screen SC is stopped. Subsequently, when the cancellation of the AV mute is instructed by the operation detected by the operation panel 41 or the remote control receiver 45, the control section 103 controls the display control section 107 to restore the light modulation device 32 to a normal display state, and restores the luminance of the light source of the light source drive section 117 to the luminance in the normal state if necessary.

Further, when the zoom button 172 is operated in the PJ interactive mode, the control section 103 functions as a projection controller in cooperation with the image processing unit 110, and starts the zoom function. The image processing unit 110 draws the zoom tool bar 18 shown in FIG. 7B and projects (displays) it on the screen SC. At this moment, the image processing unit 110 can also stop the projection of the menu bar 17. The zoom tool bar 18 is provided with buttons 181, 182 for instructing increase/decrease in zoom magnification ratio, a button 183 for designating the center position of zoom, and a button 184 for instructing the termination of the zoom function. It is also possible to provide a reset button for resetting (setting the zoom magnification ratio to 1) the zoom magnification ratio to the zoom tool bar 18 besides these buttons.

Due to the zoom function explained with reference to FIG. 7B, the projector 11 is capable of expanding and contracting the image centering on an arbitrary point on the image presently projected. When the button 183 is indicated by the indication body 12, the control section 103 and the image processing unit 110 make a transition to the operation state for designating the center of zoom, and then obtain the coordinate of the position indicated by the indication body 12, and then set the position to the center of zoom. Further, the control section 103 and the image processing unit 110 translate the image presently projected in all directions so that the center thus set overlaps the center of the actual projection area 11B.

Subsequently, when the buttons 181, 182 are operated with the indication body 12, the zoom magnification ratio is increased or decreased by a predetermined amount, and is then updated in every single operation, and the image presently projected is updated in accordance with the zoom magnification ratio thus updated. Therefore, every time the button 181, 182, or 183 is operated by the operation of the indication body 12, the projection configuration by the projection section 30 is varied. Further, when the button 184 is operated, the control section 103 and the image processing unit 110 terminate the projection of the zoom tool bar 18, and then project the menu bar 17 (FIG. 7A) instead. Further, it is also possible to provide the menu bar 17 with a button for controlling the slide show display, a button for executing a function (a freeze function) for stopping the projection image of the projector 11, a button for executing a function (a source switching function) for switching the image source, a button for performing the setting (e.g., a change in the aspect ratio and a change in the color mode) related to the function itself of the projector 11, and so on.

Further, in the case of changing the projection configuration of the image in accordance with the operation of the button 181, 182, or 183 of the zoom tool bar 18 due to the control of the control section 103, the image processing unit 110 updates the image position information in accordance with the change in the projection configuration, and the coordinate conversion section 160 converts the coordinate based on the image position information thus updated.

It is also possible for the projector 11 to translate the image, which has been expanded or contracted, in all directions in accordance with the operation of the user. When the translation of the image is instructed by the user, the control section 103 and the image processing unit 110 translate the image in accordance with the instruction. The user can instruct the translation of the image by operating the buttons provided to the operation section of the operation panel 41, the remote controller, and so on. Further, it is also possible for the user to translate the image by dragging the image thus expanded or contracted on the screen SC using the indication body 12. If the image can be translated, the user can more easily perform drawing to the image. For example, by translating a place (e.g., the upper part of the image) where drawing with the indication body 12 is difficult to a position near to the user, the user can easily perform drawing to such a place.

Here, in the case in which the indication body 12 overlaps the front of the menu bar 17 while the user is performing drawing by operating the button of the drawing tool group 17A using the indication body 12 in the PJ interactive mode, it is also possible for the projector 11 to continue the drawing, or to detect it as the operation to the button of the menu bar 17.

Further, in the PC interactive mode, the coordinate is output from the output switching section 163 to the PC 13, then the PC 13 detects the operation to the menu bar 17 or the zoom tool bar 18, and then performs drawing and so on. Therefore, it is preferable for the projector 11 not to detect the operation to the menu bar 17 or the zoom tool bar 18 in the PC interactive mode.

As described above, although there can be a variety of cases as the operation in the case in which the coordinate detected by the position detection unit 150 overlaps the range in which the menu bar 17 and the zoom tool bar 18 are displayed, the projector 11 is high in operability, and can operate in accordance with the intention of the user.

Figure 8:
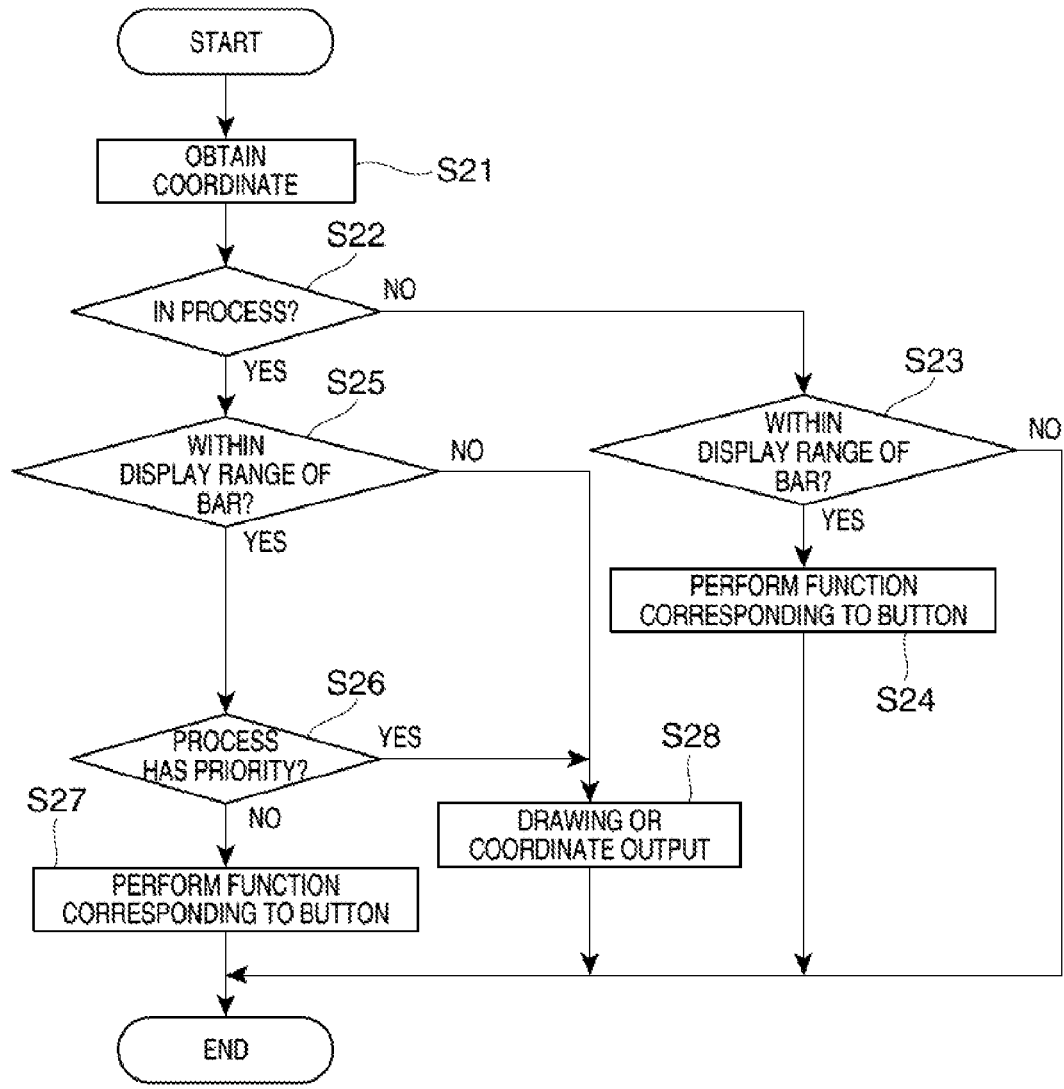
FIG. 8 is a flowchart showing an operation of the projector.

FIG. 8 is a flowchart showing the operation of the projector 11, and in particular shows the operation in the case in which the operation of the indication body 12 in the state of showing the menu bar 17 and the zoom tool bar 18.

When the control section 103 obtains (step S21) the coordinate input from the output switching section 163 to the image processing unit 110, the control section 103 determines (step S22) whether or not the process by the image processing unit 110 as the processing section or the output switching section 163 is under execution. The process of the image processing unit 110 denotes, for example, a process of performing drawing in accordance with the operation of the drawing tool group 17A (FIG. 7A) in the PJ interactive mode, and the process of the output switching section 163 denotes, for example, a process of outputting the coordinate to the PC 13 in the PC interactive mode.

In the case in which the process described above is not under execution (NO in the step S22), the control section 103 determines (step S23) whether or not the coordinate thus obtained is in the range where the menu bar 17 or the zoom tool bar 18 is displayed. Here, the control section 103 obtains the coordinates representing the display range (the operation area) of the menu bar 17 or the zoom tool bar 18, which is projected due to the function of the image processing unit 110, from the image processing unit 110, and then performs the determination by comparing the coordinates thus obtained and the coordinate output in the step S21 with each other. If the coordinate thus obtained is located within the range where the menu bar 17 or the zoom tool bar 18 is displayed (YES in the step S23), the control section 103 identifies the button overlapping the coordinate thus obtained, then performs (step S24) the function corresponding to the button thus identified, and then terminates the present process. Further, if the coordinate thus obtained is not located within the range where the menu bar 17 or the zoom tool bar 18 is displayed (NO in the step S23), the control section 103 terminates the present process without performing any process, and then waits until the next time the coordinate is obtained.

On the other hand, if the process by the image processing unit 110 as the processing section or the output switching section 163 is under execution (YES in the step S22), the control section 103 determines (step S25) whether or not the coordinate thus obtained is located within the range where the menu bar 17 or the zoom tool bar 18 is displayed similar to the step S23. Then, if the coordinate thus obtained is located within the range where the menu bar 17 or the zoom tool bar 18 is displayed (YES in the step S25), the control section 103 determines (step S26) whether priority is given to the operation of the menu bar 17 and the zoom tool bar 18 or to the process under execution based on the present operation mode (the PC interactive mode or the PJ interactive mode) and the setting value included in the setting data 105B. For example, higher priority is given to the operation to the menu bar 17 or the zoom tool bar 18 than the process in execution in the PJ interactive mode, and in the PC interactive mode, priority is given to the process of outputting the coordinate to the PC 13.

Then, if priority is not given to the process in execution (NO in the step S26), the control section 103 identifies the button overlapping the coordinate output by the output switching section 163 in the menu bar 17 or the zoom tool bar 18, then performs (step S27) the function corresponding to the button thus identified, and then terminates the present process.

Further, if the coordinate obtained in the step S21 is located within the range where the menu bar 17 or the zoom tool bar 18 is displayed (YES in the step S25), and priority is given to the process in execution (YES in the step S26), the control section 103 continuously performs (step S28) the process presently performed by the processing section such as drawing by the image processing unit 110 or the output of the coordinate to the PC 13 without performing the function related to the buttons of the menu bar 17 and the zoom tool bar 18, and then terminates the present process. Further, if the coordinate obtained in the step S21 is not located within the display range of the menu bar 17 or the zoom tool bar 18 (NO in the step S25), the control section 103 terminates the present process without performing any process, and then waits until the next time the coordinate is obtained.

As described above, the projector 11 according to the embodiment to which the invention is applied is for projecting the image on the screen SC based on the supplied image supplied by the image source, and is provided with the position detection unit 150 for detecting the position indicated on the screen SC, and the control section 103 for controlling the projection configuration of the image in the case in which the indication position detected by the position detection unit 150 is located within the display range of the menu bar 17 or the zoom tool bar 18 as the operation area set previously. Further, the projector 11 controls the projection configuration of the image presently projected in accordance with the operation to the screen SC, and for example, changes the zoom magnification ratio in accordance with the operation of the buttons 181, 182, and translates the position designated by the operation of the button 183 to the center. Thus, it is possible to make the operation related to the projection configuration of the image intuitive and easy to thereby achieve the improvement of the operability.

Further, the projector 11 performs the process of outputting the coordinate of the indication position detected by the position detection unit 150 to the PC 13 with the output switching section 163 as the processing section, or performs drawing based on the indication position detected by the position detection unit 150 with the image processing unit 110 as the processing section. When the indication position detected by the position detection unit 150 is located within the display range of the menu bar 17 or the zoom tool bar 18, the projector 11 performs either of the process described above and the control by the control section 103. Therefore, it is possible to selectively use the function of performing the process such as drawing based on the indication position and the function of controlling the projection configuration of the image based on the indication position according to the circumstances, and it is possible to achieve further improvement of the operability.

Further, by using the zoom tool bar 18, it is possible to expand, contract, or translate the image projected on the screen SC with the operation of the indication body 12 by the intuitive operation, and the improvement in operability can be achieved.

Further, the projector 11 is provided with the projection unit 3 for displaying the display image on the screen SC based on the image data input via the external I/F 102 or the image data stored in the storage section 105, the image detection section 151 for detecting the indication position with respect to the display image on the screen SC, the coordinate calculation section 159 for calculating the first coordinate, which is the coordinate of the indication position in the display-allowable area (e.g., the actual projection area 11B) in the screen SC, the coordinate conversion section 160 for converting the first coordinate calculated by the coordinate calculation section 159 into the second coordinate as the coordinate in the image data, and the output switching section 163 for outputting the second coordinate obtained by the coordinate conversion section 160, and outputs the coordinate of the indication position by the indication body 12 as the coordinate in the image data, and therefore, it is possible to identify the relative position between the indication position and the image data in the PC 13 and so on, which use the coordinate thus output, without being affected by the display configuration such as the display resolution or the size of the display area. Since it is not necessary to make the image data itself and the indication position directly correspond to each other in the process of obtaining the coordinate of the indication position in the image data, it is not necessary to perform the calibration even if the change in size and so on of the image data occurs. Therefore, the execution frequency of the calibration can be reduced. Thus, enhancement of the convenience of the projector 11 can be achieved. Further, since it is not necessary to execute the program for the calibration on the PC 13 side, the load of the user unfamiliar with the operation of the PC 13 can be reduced.

Further, since the coordinate conversion section 160 converts the first coordinate calculated by the coordinate calculation section 159 into the second coordinate based on the image position information, which is the information representing the position of the display image with respect to the display-allowable area, even if the image position information, which is the information representing the position of the display image with respect to the display-allowable area, is varied, the coordinate conversion section 160 can accurately convert the coordinate of the indication position of the indication body 12, and then output the result.

Further, the coordinate conversion section 160 converts the first coordinate calculated by the coordinate calculation section 159 into the second coordinate based on the resolution of the image data. For example, the coordinate conversion section 160 performs the conversion of the coordinate using the image position information reflecting the display resolution of the projection section 30 and the resolution of the image data. Thus, the coordinate of the indication position can correctly be converted and then output even if the resolution of the image data varies.

Further, the position detection section 151 detects the position of the indication body 12 on the screen SC based on the shot image shot by the imaging section 153 to thereby detect the indication position in the actual projection area 11B, and can therefore detect the indication position promptly.

Second Embodiment

Figure 9:
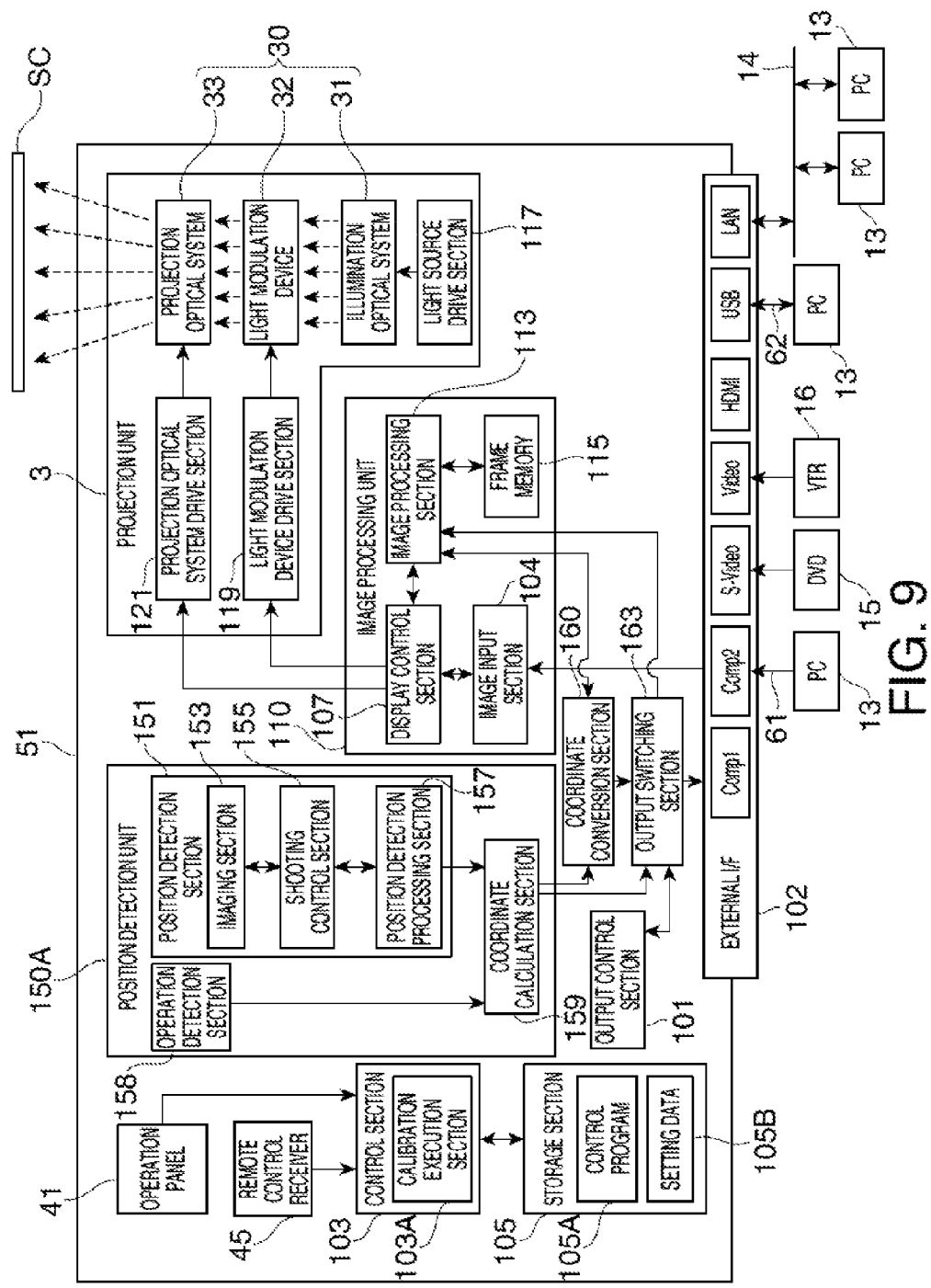
FIG. 9 is a block diagram showing a functional configuration of a projector according to a second embodiment of the invention.
Figure 10:
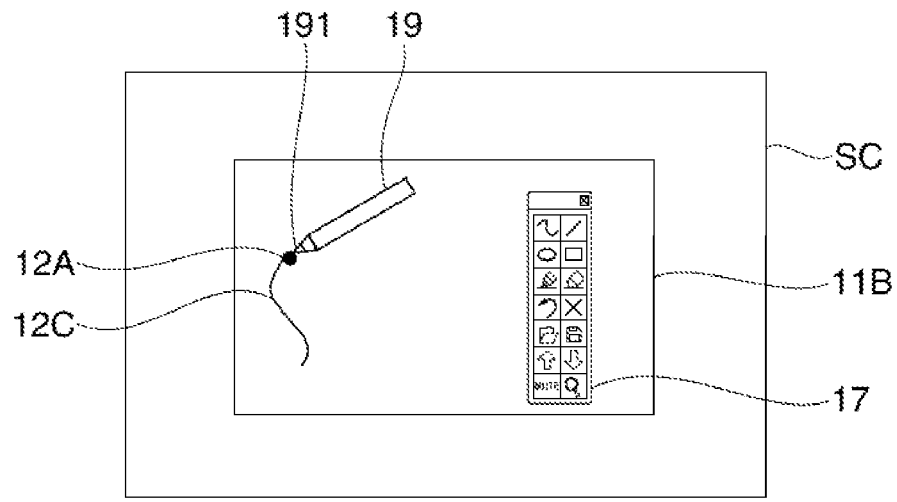
FIG. 10 is an explanatory diagram showing a configuration and a use state of an indication body used in combination with the projector in the second embodiment.

FIG. 9 is a block diagram showing a functional configuration of a projector 51 according to a second embodiment to which the invention is applied. Further, FIG. 10 is an explanatory diagram showing a configuration and a use state of an indication body 12 used in combination with the projector 51 in the second embodiment. In the second embodiment, the functional sections configured similarly to the first embodiment described above will be denoted with the same reference symbols, and the explanation therefor will be omitted.

The projector 51 shown in FIG. 9 has a configuration provided with a position detection unit 150A having an operation detection section 158 instead of the position detection unit 150 of the projector 11 shown in FIG. 2. If an indication body provided with an operator such as a switch is used instead of the indication body 12 (FIG. 1), the operation detection section 158 detects the operation of the operator in the indication body.

FIG. 10 shows the indication body 19 as an example of the indication body provided with the operator. The indication body 19 is a pen-type indication body, and is operated by the user holding it in hand similarly to the indication body 12. The tip of the indication body 19 is provided with a push switch 191 (the operator), and if, for example, the operation of pressing the tip of the indication body 19 against the screen SC is performed, the switch 191 is pressed to be set to the ON state. During the period in which the switch 191 is kept in the ON state, the indication body 19 generates an operation signal representing the operation of the switch 191, and then transmits it to the projector 51 with the wireless communication using an infrared ray or the like.

The position detection unit 150A provided to the projector 51 (FIG. 9) receives the wireless signal such as the infrared signal generated by the indication body 19, and then analyzes and decodes the wireless signal using the operation detection section 158. The operation signal representing the operation of the switch 191 is output from the operation detection section 158 to the coordinate calculation section 159, and the coordinate calculation section 159 outputs the data representing the presence or absence of the operation of the switch 191 to the coordinate conversion section 160 together with the coordinate indicated by the indication body 19.

Thus, the coordinate of the indication position indicated by the indication body 19 and the data representing the presence or absence of the operation of the switch 191 are output from the output switching section 163 to the PC 13 or the image processing unit 110. As described above, the position detection unit 150A can detect not only the indication position of the indication body 19 but also whether of not the operation has been performed on the operator (whether or not the operator is pressed). The information representing the fact that the operator has been operated and the information representing the fact that the operation to the operator has been terminated can also be output from the projector 51 to the PC 13 as the control data. For example, it is also possible for the projector 51 to output the information representing the fact that the operator has been operated to the PC 13 as the information representing the fact that the mouse has been clicked at the left button, and to output the information representing the fact that the operation to the operator has been terminated to the PC 13 as the information representing the fact that the left click on the mouse has been terminated.

In the second embodiment, it is possible not only to perform the operation based on the indication position indicated by the indication body 19 based on the coordinate output from the output switching section 163, but also to realize the operation based on the presence or absence of the operation of the switch 191. For example, in the case in which the indication position of the indication body 19 is located at a position overlapping either of the buttons of the menu bar 17 or the zoom tool bar 18, and at the same time the switch 191 is set to the ON state, the projector 51 detects it as an operation to the button. Further, in the case of performing drawing of a figure using a button of the drawing tool group 17A in the PJ interactive mode, the projector 51 draws the figure only during the period in which the switch 191 is kept in the ON state, and halts the drawing once when the switch 191 is set to the OFF state.

As described above, in the case in which the indication body 19 capable of the operation by the operator such as the switch 191 in addition to the operation of indicating the position, the projector 51 can realize the operation based on the indication position and the presence or absence of the operation of the switch 191 in accordance with the operation of the indication body 19. Further, in the case in which the indication position of the indication body 19 is located within the display range of the menu bar 17 or the zoom tool bar 18 as the operation area, and the operation detection section 158 detects the operation of the switch 191, it is possible to give priority to drawing or outputting of the coordinate by performing the control by the control section 103, or to give priority to the function corresponding to the button of the menu bar 17 or the zoom tool bar 18 to the contrary. Therefore, it is possible to selectively use the function corresponding to the indication position of the indication body and the function related to drawing and coordinate outputting according to the circumstances with ease, and it is possible to achieve further improvement of the operability.

Further, the projector 51 is capable of detecting the indication position indicated on the screen SC by the indication body 19 and the operation of, for example, the operator 191 of the indication body 19, and performs the control by the control section 103 in the case in which the operation of the indication body 19 is detected when the indication position thus detected is located within the operation area described above. Therefore, further improvement of the operability can be achieved.

Further, the projector 51 outputs the operation of the switch 191 to the PC 13 as the operation signal corresponding to the operation of a button or a switch in the general-purpose pointing device such as a mouse. In this case, the PC 13 can treat the coordinate data output from the output switching section 163 and the operation signal representing the operation of the switch 191 equivalently to the coordinate data and the operation signal output by a general-purpose pointing device. Thus, the PC 13 can perform a variety of processes corresponding to the operations using the indication body 19 making the use of a general-purpose device driver program corresponding to a general-purpose pointing device.

Further, in the case of using the indication body 19, it is possible for the projector 51 to have a configuration of obtaining and then outputting the coordinate of the indication position of the indication body 19 only during the period in which the switch 191 is kept in the ON state.

Although in the first and second embodiments described above, the explanation is presented citing the configuration, as an example, in which the function corresponding to the button of the menu bar 17 or the zoom tool bar 18 is performed when the indication position of the indication body 12, 19 is located within the display range of the menu bar 17 or the zoom tool bar 18, the invention is not limited thereto, but can be provided with a configuration of, for example, performing a predetermined function in accordance with the operation to a specific area where the menu bar 17 and the zoom tool bar 18 are not displayed. This example will be explained below as a third embodiment.

Third Embodiment

Figure 11:
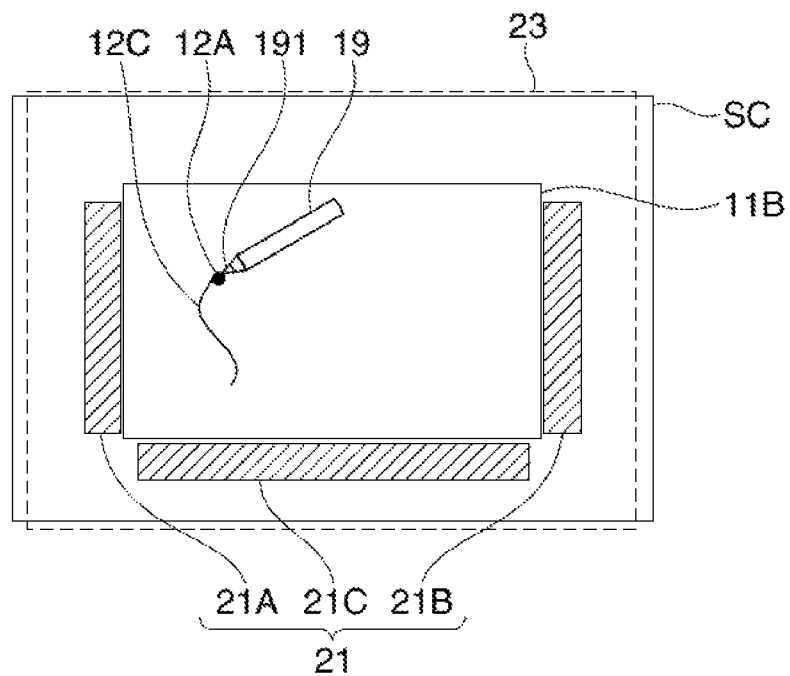
FIG. 11 is an explanatory diagram showing a use state of an indication body in a third embodiment of the invention.

FIG. 11 is an explanatory diagram showing a use state of the indication body 19 in a third embodiment of the invention.

The third embodiment can be realized by either of the combination of the projector 11 and the indication body 12 explained in the first embodiment section described above and the combination of the indication body 19 and the projector 51 explained in the second embodiment section. Here, as an example, the explanation will be presented citing the example of using the indication body 19 and the projector 51.

In the example shown in FIG. 11, function assignment areas 21 are disposed outside the actual projection area 11B on the screen SC. The function assignment areas 21 exemplified in FIG. 11 consist of a function assignment area 21A located on the right of the actual projection area 11B, a function assignment area 21B located on the left of the actual projection area 11B, and a function assignment area 21C located below the actual projection area 11B.

These function assignment areas 21 are all located inside a position detectable area 23 in which the position detection unit 150A can detect the position of the indication body 19. The position detectable area 23 is an area set on the screen SC, and in the case of using the projector 11 and the indication body 12, the area on the screen SC in which the position detection unit 150 can detect the position of the indication body 12 corresponds to the position detectable area 23.

Functions different from each other are respectively assigned to the function assignment areas 21A, 21B, and 21C. For example, the AV mute function is assigned to the function assignment area 21A, the freeze function for halting the projection image is assigned to the function assignment area 21B, and a source switching function for switching the image source is assigned to the function assignment area 21C. The projector 51 detects the coordinate of the indication position of the indication body 19 with the position detection unit 150A, then determines whether or not the coordinate overlaps either of the function assignment areas 21, and then performs the AV mute function if the indication position overlaps the function assignment area 21A. Further, the projector 51 performs the freeze function if the coordinate of the indication position of the indication body 19 detected by the position detection unit 150A overlaps the function assignment area 21B, or performs the source switching function if the coordinate of the indication position overlaps the function assignment area 21C. As described above, only by indicating the function assignment areas 21A, 21B, and 21C with the indication body 19, the user can make the specific functions assigned to the respective function assignment areas 21A, 21B, and 21C be performed.

Further, according to the third embodiment, even in the state in which the menu bar 17 and the zoom tool bar 18 are not displayed in the actual projection area 11B, the specific functions can be performed in accordance with the indication position of the indication body 19. Therefore, it is not necessary to perform the determination as shown in the flowchart of FIG. 8 required in the case in which the coordinate on the menu bar 17 or the zoom tool bar 18 is indicated. Further, in the case in which all of the function assignment areas 21A, 21B, and 21C are disposed outside the actual projection area 11B, there is no competition against the process such as drawing or coordinate outputting with respect to the inside of the actual projection area 11B, and therefore, the specific functions assigned to the respective function assignment areas 21A, 21B, and 21C can promptly be performed. It should be noted that it is also possible to assign other functions to the respective function assignment areas 21A, 21B, and 21C besides the source switching function. For example, a reset function for restoring the projection configuration to the initial state, and a mode switching function for switching between the PJ interactive mode and the PC interactive mode can also be assigned to either of the function assignment areas.

It should be noted that the first through third embodiments described above are each nothing more than an example of a specific aspect to which the invention is applied, and therefore, do not limit the invention. Therefore, it is also possible to apply the invention as an aspect different from the embodiments described above. For example, although in the embodiments described above, the explanation is presented citing, as examples, the configuration in which the coordinate after the conversion is output to the PC 13, and the PC 13 draws the pointer 12A, the menu bar 17, the zoom tool bar 18, and so on, and the configuration in which the pointer 12A, the menu bar 17, the zoom tool bar 18, and so on are drawn by the image processing unit 110 provided to the projector 11, 51, the invention is not limited thereto, but it is also possible to dispose an image processing unit 120 for generating the image, which is drawn so as to be superimposed on the image data, such as the pointer 12A or the menu bar 17 in the projector 11. This example will be explained below as a fourth embodiment.

Fourth Embodiment

Figure 12:
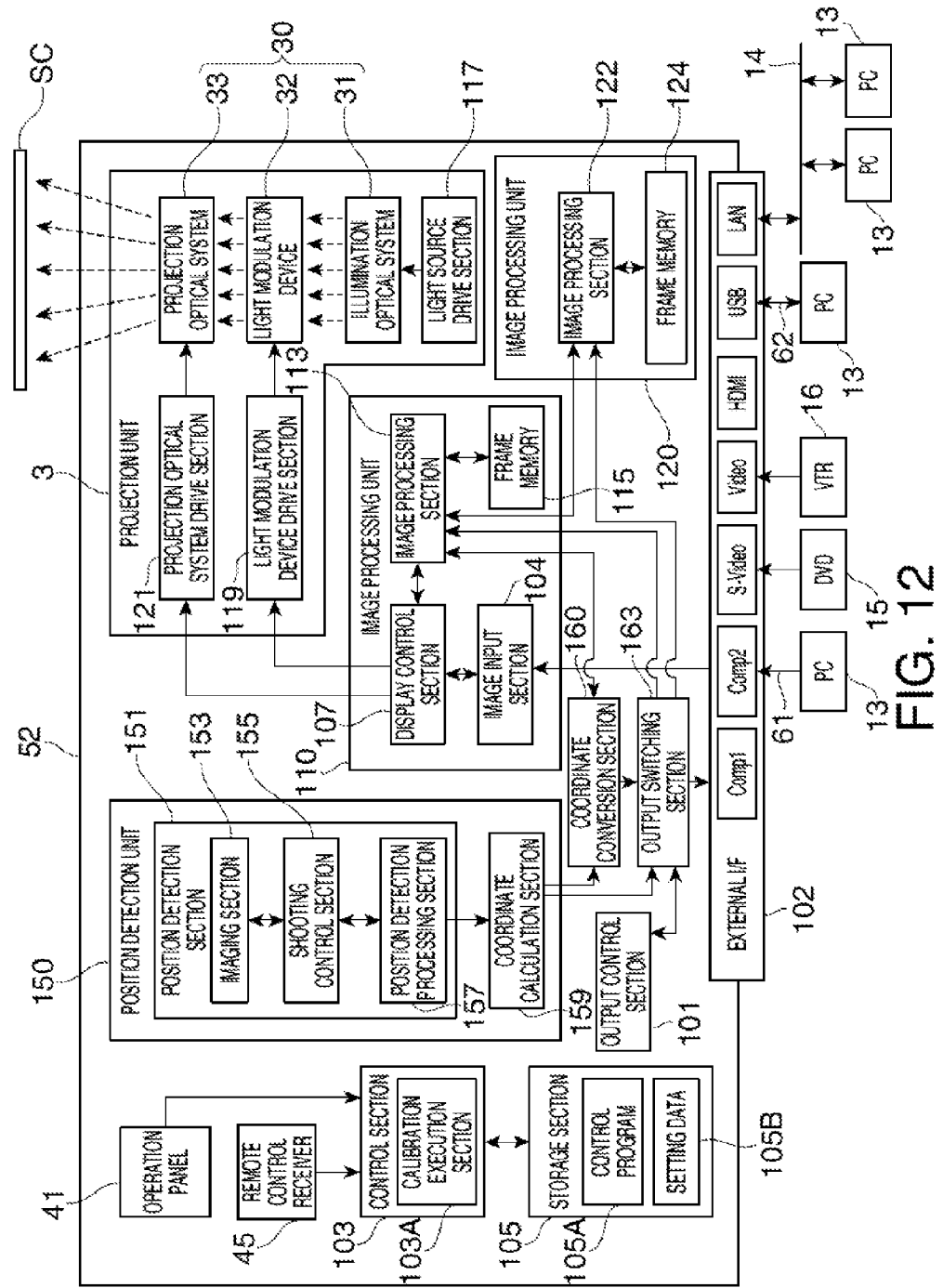
FIG. 12 is a block diagram showing a functional configuration of a projector according to a fourth embodiment of the invention.

The projector 52 shown in FIG. 12 has functional sections similar to those of the projector 11 according to the above embodiment, and is provided with the image processing unit 120 for drawing the pointer 12A, the menu bar 17, and so on in accordance with the indication position of the indication body 12. In other words, the projector 52 is provided with the image processing unit 120 (a second image processing unit) in addition to the image processing unit 110 (a first image processing unit). The image processing unit 120 is provided with an image processing section 122 for generating the image to be superimposed on the image data in accordance with the coordinate input from the coordinate conversion section 160, and a frame memory 124 for developing the data when the image processing section 122 generates the image.

When the coordinate conversion section 160 outputs the coordinate data after the conversion to the image processing unit 120, the image processing unit 120 draws the images of the pointer 12A and the menu bar 17 with the image processing section 122, and then outputs the image with the pointer 12A and the menu bar 17 drawn to the image processing section 113. Here, the image output by the image processing section 122 includes any of the images of the pointer 12A, the menu bar 17, and so on. The image processing section 113 combines the image input from the image processing section 122 with the image developed on the frame memory 115. Thus, the image processing unit 110 can promptly superimpose the pointer 12A and the menu bar 17 on the input image, and then display the result.

In this configuration, it is also possible to adopt the setting of, for example, outputting the coordinate to both of the image processing unit 110 and the image processing unit 120 in the case in which the image processing unit is set to the output destination of the coordinate due to the setting of the setting data 105B (FIG. 12). Further, it is also possible to set the setting data 105B so that the coordinate is output from the coordinate conversion section 160 to the image processing unit 110, and the coordinate is then output from the image processing unit 110 to the image processing unit 120. Alternatively, in the case of adopting the configuration in which the drawing of the pointer 12A, the menu bar 17, the drawn FIG. 12C, and the trajectory 12D based on the indication position of the indication body 12 is performed only by the image processing unit 120, it is also possible to set the setting data 105B so that the coordinate is output from the coordinate conversion section 160 to only the image processing unit 120. Further, in the case in which the output destination set to the setting data 105B is set to the "image processing unit," it is also possible for the output control section 101 to perform the process of outputting the coordinate only to the image processing unit 120. Further, during the execution of the multi-screen display function, it is also possible to set the output destination of the coordinate of the output switching section 163 to both of the image processing units 110, 120, or to the image processing unit 120 alone.

The invention is not limited to the embodiments described above, but can be put into practice in various forms within the scope or the spirit of the invention, and the following modifications, for example, are also possible.

Although in the configuration of the embodiments described above, the explanation is presented citing the configuration as an example, in which the coordinate conversion section 160 converts the coordinate of the indication position calculated by the coordinate calculation section 159, and then outputs the coordinate after the conversion, the invention is not limited thereto. For example, it is also possible to adopt the configuration in which the coordinate conversion section 160 stops outputting the coordinate after the conversion in the case in which the coordinate of the indication position calculated by the coordinate calculation section 159 is not included in the area where the image data is displayed. Further, it is also possible to adopt the configuration in which the coordinate conversion section 160 stops outputting the coordinate after the conversion one of while the projector 11 is determining the type of the signal input from the outside, while the projector 11 is freezing the image projected, while the projector 11 is halting the projection of the image, and so on. It should be noted that the projector 11 can halt the projection of the image due to the control of the control section 103 one of when the projection optical system 33 is blocked by a movable blocking section (not shown) such as a shutter disposed in front of the projector 11, when receiving the instruction of haling the projection of the image via the operation section such as the operation panel 41 or the remote controller, and so on.

Further, in the configuration of the embodiments described above, it is also possible to substitute the imaging section 153 and the shooting control section 155 provided to the position detection unit 150 with an imaging device (e.g., a digital camera) externally connected to the projector 11. The digital camera in this case is only required to perform shooting in accordance with the control of the control section 103, and then output the shot image data to the position detection processing section 157. Further, since a general-purpose interface such as USB can be used as the interface for connecting the digital camera and the projector 11 with each other, the configuration can easily be realized. Further, it is also possible to adopt the configuration in which the position detection unit 150 is externally connected to the projector 11. In this case, a device separated from the projector 11 can be used as the position detection unit 150.

Further, although in the embodiments described above, the explanation is presented citing the configuration as an example, in which the indication body 12 is provided with the switch 191 as the operator, and the operation signal is transmitted from the indication body 12 to the projector 51 when the switch 191 is pressed, the invention is not limited thereto. For example, the indication body 12 can be provided with the configuration of emitting light (non-visible light or visible light) with a predetermined wavelength in response to the operation of the operator, and then stopping the emission of the light in response to the termination of the operation. In this case, whether or not the light is emitted from the indication body 12 can be determined based on the shot image data shot by the imaging section 153. Therefore, the position detection processing section 157 can detect not only the indication position of the indication body 12 but also whether of not the operation is performed on the operator (whether or not the operator is pressed).

Further, although the explanation is presented in the example described above citing the configuration as an example, in which the light with a predetermined wavelength is emitted from the indication body 12 when the operator is operated, and the emission of the light is halted when the operation is terminated, the invention is not limited thereto. For example, the indication body 12 can be provided with the configuration of always emitting the light with a predetermined wavelength at a predetermined pattern, and then emitting the light at a different pattern when an operation is performed on the operator. In this case, since the indication body 12 always emits light at a predetermined pattern, the position detection processing section 157 can always detect the indication position of the indication body 12. Further, the position detection processing section 157 can detect whether or not the operation is performed on the operator based on the light emitting pattern.

Also in such a case, if the indication body 12 is provided with the operator such as the switch 191, it is also possible to output the information representing the fact that the operator has been operated, and the information representing the fact that the operation to the operator has been terminated from the projector to the PC as the control data. For example, it is also possible for the projector to output the information representing the fact that the operator has been operated to the PC as the information representing the fact that the mouse has been clicked at the left button, and to output the information representing the fact that the operation to the operator has been terminated to the PC as the information representing the fact that the left click on the mouse has been terminated.

Further, although in the embodiments described above the explanation is presented citing the configuration as an example, in which the control section 103 functions as the calibration execution section 103A, the invention is not limited thereto. For example, it is also possible for the position detection unit 150 to be provided with the whole or a part of the function of the calibration execution section 103A. In particular, in the case in which the position detection unit 150 is the imaging device externally connected to the projector 11, and the imaging device functions as the calibration execution section 103A, the projector 11 is not required to be provided with the constituent corresponding to the calibration execution section 103A.

Further, it is also possible for a device externally connected to the projector 11 to function as the position detection unit 150, the calibration execution section 103A, and the coordinate conversion section 160. Further, it is also possible for a device externally connected to the projector 11 to function as the position detection unit 150, and the coordinate conversion section 160.

Further, although in the embodiments described above the explanation is presented citing the configuration as an example, in which the projector 11 performs at least either of the processes of expanding, contracting, and translating the image, the invention is not limited thereto. The projector 11 can also perform rotation of the image besides the expansion, contraction, and translation of the image. In this case, it is also possible to provide a button for instructing the start of the image rotation function to the projection configuration control group 17C of the menu bar 17.

Further, although in the embodiments described above the explanation is presented citing the configuration as an example, in which the projector 11 translates the image expanded or contracted, the invention is not limited thereto. The projector 11 can also translate the image presently projected in all directions in the state (i.e., the state of the same size) in which the image is not expanded or contracted. Also in this case, it is possible to translate the image by the operation to the operation section, the operation of dragging the image with the indication body 12, and so on. By translating the image, the user can easily perform drawing in the place (e.g., the upper part of the image) where drawing with the indication body 12 is difficult in a normal condition.

Further, although in the embodiments described above the explanation is presented citing the configuration as an example, in which the projector 11 translates the image, the invention is not limited thereto. The projector 11 can also translate the cursor in all directions instead of the image.

Further, although in the embodiments described above, the explanation is presented citing the configuration as an example, in which the PC 13 and the projector 11 are connected to each other via a cable or the like in a wired manner, the connection configuration between the projector 11 and the PC 13 is arbitrary. It is also possible to adopt the configuration in which, for example, the projector 11 and the PC 13 are connected to each other with wireless communication such as a wireless LAN, and transmit/receive the image data and the coordinate data via a wireless communication line.

Further, in the configuration of the embodiments described above, the indication body 12 is not limited to those having a rod shape or a pen shape, but it is also possible to adopt the configuration of using, for example, a finger of the user as the indication body 12, and detecting the indication position thereof.

Further, although in the configuration of the embodiments described above the explanation is presented citing the configuration as an example, in which the position detection unit 150 detects the indication position by the indication body 12 based on the shot image data, the invention is not limited thereto, but it is also possible to adopt the configuration in which, for example, a pressure-sensitive or capacitance touch panel is provided to the screen SC as a display surface or a display screen in other display systems, and the contact of a finger of the user or a rod member as the indication body 12 is detected by the touch panel.

Further, although in the embodiment described above the explanation is presented citing, as an example, the configuration in which the light modulation device 32 uses the three transmissive or reflective liquid crystal panels corresponding to the respective colors of RGB as means for modulating the light emitted by the light source, the invention is not limited thereto, but can be configured using a system including one liquid crystal panel and a color wheel combined with each other, a system using three digital mirror devices (DMD), a DMD system using one digital mirror device and a color wheel combined with each other, and so on. Here, in the case of using just one liquid crystal panel or DMD as a display section, the member corresponding to the combining optical system such as the cross dichroic prism is not necessary. Further, besides the liquid crystal panel or the DMD, any configuration capable of modulating the light emitted from the light source can be adopted without problems.

Further, the display device according to the invention is not limited to the projector for projecting the images to the screen SC, but various display devices including a liquid crystal monitor or a liquid crystal television set for displaying images on a liquid crystal panel, a monitor device or a television receiver for displaying images on a plasma display panel (PDP), a light emitting display device such as a monitor device or the television receiver for displaying images on an organic EL display panel called an organic light-emitting diode (OLED), an organic electroluminescence (OEL), and so on can also be included in the image display device according to the invention. In this case, the liquid crystal panel, the plasma display panel, and the organic EL display panel each correspond to the display section, and the display screen thereof corresponds to the display surface. In more detail, the entire area capable of displaying the image corresponds to the projection-allowable area 11A, and the case of always displaying the image in the entire projection-allowable area 11A corresponds to the case in which the projection-allowable area 11A and the actual projection area 11B coincide with each other.

Further, each of the functional sections of the projector 11, 51, 52 shown in FIGS. 2, 9, and 12, and each of the functional sections of the PC 13 shown in FIG. 3 show the functional configuration realized by hardware and software in cooperation with each other, and the specific implementation configuration is not particularly limited. Therefore, it is not necessarily required to install the hardware corresponding individually to each of the functional sections, but it is obviously possible to adopt the configuration of realizing the functions of the plurality of functional sections by one processor executing the program. Further, a part of the function realized by software in the embodiments described above can also be realized by hardware, or a part of the function realized by hardware can also be realized by software. Besides the above, the specific detailed configuration of each of other sections of the display system 10 including the projector 11 and the PC 13 can arbitrarily be modified within the scope or the spirit of the invention.

Further, it is also possible for the projector 11 to download the control program 105A, which is stored in the storage section 105 in the embodiments described above, from another device connected via the communication network, and then execute the control program 105A, or it is also possible to adopt the configuration of recording the control program 105A on a portable recording medium, retrieving each of the programs from the recording medium, and then executing the program. The same can be applied to the display control program 13A stored by the PC 13, and it is also possible for the PC 13 to download the display control program 13A from another device and then execute the program, or it is possible to adopt the configuration in which the PC 13 retrieves the display control program 13A stored in a portable recording device, and then executes the program.

The entire disclosure of Japanese Patent Application No. 2011-285317, filed Dec. 27, 2011 is expressly incorporated by reference herein.

What is claimed is:

1. A projector adapted to project a display image on a projection surface, comprising:
    a position detector adapted to detect a position indicated on the projection surface;
    a display controller adapted to draw a figure on the display image along a trajectory of an indication position detected by the position detector;
    an operating image display section adapted to superimpose an operating image on a part of the display image; and
    a projection controller adapted to control a projection configuration of the display image in the case the indication position is located within an operation area where the operating image is superimposed,
    wherein, while the display controller draws the figure, the display controller continues drawing the figure and the projection controller doesn't control the projection configuration even if the indication position is located within the operation area.

2. The projector according to claim 1, further comprising:
    an operation detector adapted to detect an operation of an indication body,
    wherein the position detector detects the indication position indicated on the projection surface by the indication body, and
    in the case the operation of the indication body is detected by the operation detector when the indication position detected by the position detector is located within the operation area, the projection controller controls the projection configuration of the display image.

3. The projector according to claim 1, wherein
    the position detector detects the indication position indicated on the projection surface by an indication body, and an operation of the indication body, and
    in the case the operation of the indication body is detected by the position detector when the indication position detected by the position detector is located within the operation area, the projection controller controls the projection configuration of the display image.

4. The projector according to claim 1, wherein
the operating image display section superimposes the operating image, which is adapted to instruct at least one of processes of expansion, contraction, translation, and rotation of the display image, and
the projection controller performs a process corresponding to the operating image overlapping the indication position detected by the position detector to change the projection configuration of the display image.

5. A method of controlling a projector adapted to project a display image on a projection surface, the method comprising:
  detecting a position indicated on the projection surface;
  causing a display controller to draw a figure on the display image along a trajectory of the position detected on the projection surface;
  superimposing an operating image on a part of the display image; and
  controlling a projection configuration of the display image in the case the indication position is located within an operation area where the operating image is superimposed,
wherein, while the figure is being drawn, the projection configuration isn't controlled and the figure continues to be drawn even if the indication position is located within the operation area.

6. The projector according to claim 2,
wherein, the display controller draws the figure on the display image while the operation of the indication body is detected by the operation detector.

7. The projector according to claim 3,
wherein, the display controller draws the figure on the display image while the operation of the indication body is detected by the position detector.

* * * * *